US012116856B2

United States Patent
Amsellem et al.

(10) Patent No.: US 12,116,856 B2
(45) Date of Patent: Oct. 15, 2024

(54) DETECTION SYSTEMS AND METHODS FOR AN ELASTOMER COMPONENT

(71) Applicant: Schlumberger Technology Corporation, Sugar Land, TX (US)

(72) Inventors: Olivier Amsellem, Le Plessis Robinson (FR); Stephane Hoareau, Clamart (FR); Hikmet Andic, Paris (FR); Mathieu Dauphin, Cambridge, MA (US); Matthew Givens, Houston, TX (US); Estelle Espinosa, Beziers (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 17/907,605

(22) PCT Filed: Mar. 30, 2021

(86) PCT No.: PCT/US2021/024767
§ 371 (c)(1),
(2) Date: Sep. 28, 2022

(87) PCT Pub. No.: WO2021/202441
PCT Pub. Date: Oct. 7, 2021

(65) Prior Publication Data
US 2023/0144146 A1 May 11, 2023

Related U.S. Application Data

(60) Provisional application No. 63/002,377, filed on Mar. 31, 2020, provisional application No. 63/002,379, (Continued)

(51) Int. Cl.
*E21B 33/06* (2006.01)
*G01M 3/28* (2006.01)

(52) U.S. Cl.
CPC ........... *E21B 33/06* (2013.01); *G01M 3/2876* (2013.01)

(58) Field of Classification Search
CPC .......................................... E21B 33/06–33/064
See application file for complete search history.

(56) References Cited

U.S. PATENT DOCUMENTS 4,922,423 A * 5/1990 Koomey ............... E21B 33/063
166/373
9,163,471 B2 10/2015 Coonrod et al.
(Continued)

FOREIGN PATENT DOCUMENTS

NO 20160506 A1 10/2017
WO 2014130703 A2 8/2014
(Continued)

OTHER PUBLICATIONS

Search Report and Written Opinion of International Patent Application No. PCT/US2021/024767 on Jul. 16, 2021; 10 pages.
(Continued)

*Primary Examiner* — Blake Michener
(74) *Attorney, Agent, or Firm* — Jeffrey D. Frantz

(57) ABSTRACT

A detection system includes a pressure sensor configured to contact an annular elastomer component of an annular BOP, wherein the pressure sensor is configured to generate a first signal indicative of a contact pressure with the annular elastomer component. The detection system also includes a piston stroke sensor configured to generate a second signal indicative of a piston stroke distance. The detection system further includes a controller configured to receive the first signal from the pressure sensor and the second signal from the piston stroke sensor and analyze respective changes in the contact pressure and respective changes in the piston stroke distance to determine a condition of the annular BOP.

20 Claims, 22 Drawing Sheets

Related U.S. Application Data filed on Mar. 31, 2020, provisional application No. 63/002,382, filed on Mar. 31, 2020.

(56) References Cited

U.S. PATENT DOCUMENTS

| | | |
|---|---|---|
| 9,187,974 B2 | 11/2015 | Coonrod et al. |
| 9,616,659 B2 | 4/2017 | Morikawa |
| 9,804,039 B2 | 10/2017 | Reyes, III et al. |
| 10,190,380 B2 | 1/2019 | Trivedi et al. |
| 10,233,715 B2 | 3/2019 | Zonoz et al. |
| 10,570,689 B2 | 2/2020 | Jaffrey |
| 2015/0007651 A1 | 1/2015 | Reyes Salvador et al. |
| 2016/0123785 A1 | 5/2016 | Gaude |
| 2017/0130562 A1 | 5/2017 | Jaffrey et al. |
| 2017/0130575 A1 | 5/2017 | Jaffrey |
| 2018/0038220 A1 | 2/2018 | Mourre et al. |
| 2019/0226295 A1 | 7/2019 | Zonoz |
| 2019/0271225 A1 | 9/2019 | Amsellem et al. |
| 2021/0348470 A1* | 11/2021 | Tenorio ................. E21B 33/085 |

FOREIGN PATENT DOCUMENTS

| | | |
|---|---|---|
| WO | 2017079413 A1 | 5/2017 |
| WO | 2017079420 A1 | 5/2017 |
| WO | 2019147827 A1 | 8/2019 |

OTHER PUBLICATIONS

International Preliminary Report on Patentability of International Patent Application No. PCT/US2021/024767 dated Oct. 13, 2022, 7 pages.

Extended Search Report issued in European Patent Application No. 21780617.3 dated Feb. 27, 2024, 7 pages.

* cited by examiner

DETECTION SYSTEMS AND METHODS FOR AN ELASTOMER COMPONENT

CROSS-REFERENCE TO RELATED APPLICATIONS

This application is a National Stage Entry of International Patent Application No. PCT/US2021/024767, filed on Mar. 30, 2021, entitled "DETECTION SYSTEMS AND METHODS FOR AN ELASTOMER COMPONENT," which claims priority to and the benefit of U.S. Provisional Application No. 63/002,377, entitled "TOOL DIAMETER AND JOINT DETECTION SYSTEMS AND METHODS," filed Mar. 31, 2020; U.S. Provisional Application No. 63/002,379, entitled "DONUT COLLAPSE DETECTION SYSTEM AND METHOD," filed Mar. 31, 2020; and, U.S. Provisional Application No. 63/002,382, entitled "PACKER VOLUME LOSS DETECTION SYSTEM AND METHOD," filed Mar. 31, 2020. These applications are incorporated by reference in their entireties herein.

BACKGROUND

Elastomeric materials are used for a variety of applications in many different settings. In the oil and gas industry, elastomer material is used in many components including seals, donuts, and packers. In many situations, such as in the oil and gas industry, in situ monitoring of the elastomer properties, such as for fatigue due to temperature and/or pressure cycling, is either impossible or impractical due to the inaccessibility of the component and/or a relatively high intervention cost.

In well drilling operations such as in the oil and gas industry, blowout preventers (BOPS) are an important "valve" for well pressure control. Each of the elastomer packer elements of a BOP has an operational lifetime or service life. The service life of the packer element is influenced by the operation conditions such as closing/opening cycles, pressures, temperatures, exposed chemicals etc. The service life can be significantly reduced due to the adverse operation conditions, such as high operation pressures, temperatures and harsh chemicals. This situation causes significant challenges in predicting the service life of packer element of BOPs. In a real well blowout situation, a misprediction on service life of packer element of BOP could have severe consequences. Therefore, a reasonable prediction of the service life of packer element of BOP could not only reduce the operation cost, but also increase the confidence level during operation. In subsea BOPs, the prediction of service life of packer elements becomes even more important because it is extremely expensive to replace the packer element in subsea installation. Furthermore, the subsea environment requires an even higher confidence level for BOPs during operation. Hence, a reliable method to monitor the service life of elastomeric packer elements in BOPs in the oil and gas wells is highly desirable.

BRIEF DESCRIPTION

This summary is provided to introduce a selection of concepts that are further described below in the detailed description. This summary is not intended to identify key or essential features of the claimed subject matter, nor is it intended to be used as an aid in determining or limiting the scope of the claimed subject matter as set forth in the claims.

According to some embodiments, methods are described for monitoring service life characteristics of an elastomer component in a BOP. The elastomer component is used for sealing a central bore of the BOP and the methods can include: measuring in situ on the BOP while deployed at a wellsite a parameter indicating sealing pressure of the elastomer component; and estimating a service life characteristic of the elastomer component based at least in part on the in situ measurement of the parameter.

According to some embodiments, the measuring is made with a sensor device that directly contacts an elastomer material of the elastomer component being monitored or of a second elastomer component that directly contacts the elastomer component being monitored. According to some embodiments, the measuring is made with a sensor device configured to measure contact pressure of the elastomer material.

According to some embodiments, the sensor device is of one of the following types: an integrated electronic piezoelectric (IEPE) pressure sensor; a strain gauge configured to measure deformation of a diaphragm contacting the elastomer material; and a type that employs an optical fiber having a plurality of distributed Bragg reflectors contained therein. In some cases, the optical fiber directly contacts elastomer material of the elastomer component being monitored or of a second elastomer component that directly contacts the elastomer component being monitored. Alternatively or in addition, the optical fiber can directly contact a metallic casing that houses the elastomer component being monitored or a second elastomer component that directly contacts the elastomer component being monitored.

According to some embodiments, the estimates of service life are at least based in part on comparing the in situ measurements with a predetermined value or values (e.g., threshold(s)) that indicate when the elastomer component is nearing the end of its useful life. The predetermined value or values can be set based on measurements made under real or simulated conditions, such as in a laboratory setting. The predetermined value or values can be set based on analysis of prior BOP case studies. According to some embodiments, the estimates of service life can be based on detecting changes in stress relaxation behavior of the elastomer material.

According to some embodiments, the estimates of services life can be based on fluid pressure measured in situ within a central bore of the BOP at a first location using a first pressure sensor. The first location can be below the elastomer component and the estimating of the service life characteristics of the elastomer component can include estimating elastomer volume or changes in elastomer volume based at least in part on measurements of fluid pressure from the first pressure sensor during movement of a piston of the BOP used to actuate the sealing in the central bore of the BOP.

According to some embodiments, fluid pressure can also be measured in situ on the BOP at a second location using a second pressure sensor, with a first location being below the elastomer component and a second location being above the elastomer component. The method can include calibrating at least one of the first and second pressure sensors based at least in part on a pressure differential between the first and second locations from measurements made by the first and second sensors while the BOP bore is not sealed, a known vertical distance between the first and second locations, and a known density of fluid within the central bore.

According to some embodiments, the service life characteristic(s) being estimated can include detecting potential leakage of the sealing in the central bore due to elastomer wear based at least in part on measurements made by the first and second pressure sensors while the central bore of the BOP is in a sealed configuration.

The BOP can be an annular type or ram-type BOP, and in some embodiments, the BOP is deployed in a subsea location.

According to some embodiments, methods are also described for investigating causes of failure of one or more components of a BOP. The methods can include: measuring in situ on the BOP, while deployed at a wellsite, a parameter indicating sealing pressure of an elastomer component used for sealing in the BOP; recording the in situ measurements; and analyzing the recorded measurements to determine one or more parameters related to failure of one or more components of the BOP. According to some embodiments, the one or more parameters can include one or more of the following: number of BOP actuations, number of BOP pressure tests, a number of stripping operations performed using the BOP, and a number of joints passing the BOP during stripping operations.

As used herein, the term "sealing pressure" of an elastomeric component refers to the pressure the elastomeric component exerts on a sealing object. As used herein, parameters that indicate sealing pressure also include parameters that indicate properties closely related to sealing pressure of the elastomeric component, such as a contact pressure and a material stress of the elastomer of the elastomeric component.

BRIEF DESCRIPTION OF THE DRAWINGS

The subject disclosure is further described in the following detailed description, and the accompanying drawings and schematics of non-limiting embodiments of the subject disclosure. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The particulars shown herein are for purposes of illustrative discussion of the embodiments of the present disclosure only. In this regard, no attempt is made to show structural details of the present disclosure in more detail than is necessary for the fundamental understanding of the present disclosure, the description taken with the drawings making apparent to those skilled in the art how the several forms of the present disclosure may be embodied in practice.

When introducing elements of various embodiments, the articles "a," "an," "the," "said," and the like, are intended to mean that there are one or more of the elements. The terms "comprising," "including," "having," and the like are intended to be inclusive and mean that there may be additional elements other than the listed elements. The use of "top," "bottom," "above," "below," and variations of these terms is made for convenience, but does not require any particular orientation of the components relative to some fixed reference, such as the direction of gravity. The term "fluid" encompasses liquids, gases, vapors, and combinations thereof. Numerical terms, such as "first," "second," and "third" may be used to distinguish components to facilitate discussion, and it should be noted that the numerical terms may be used differently or assigned to different elements in the claims.

According to some embodiments, systems and methods are described for monitoring elastomer components, such as monitoring a condition and/or a service life of packer elements (e.g., elastomer packer elements) of annular blowout preventers (BOPS) using measurements that indicate stress on the packer elements. In some embodiments, one or more sensors (such as pressure and/or strain sensors) are installed in a BOP housing where a contact pressure of the packer element can be directly measured. The measured contact pressure, which indicates stress in elastomeric material of the packer element, can be correlated with the condition and/or the service life of the packer element.

Figure 1:
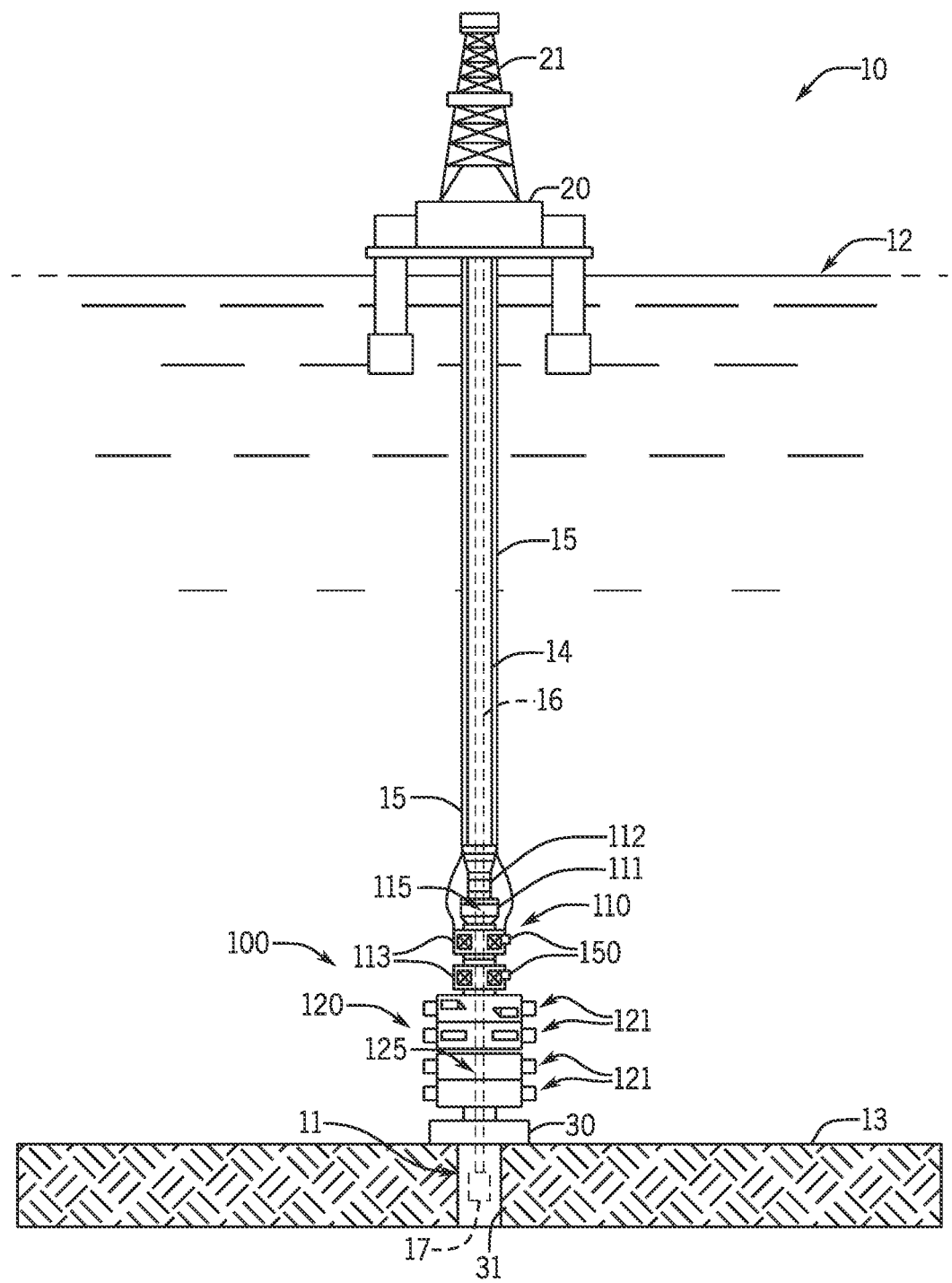
FIG. 1 is a diagram illustrating a drilling and/or producing wellsite where an elastomer characterization system could be deployed, according to some embodiments.

FIG. 1 is a diagram illustrating a drilling and/or producing wellsite 10 where an elastomer characterization system could be deployed, according to some embodiments. In this example, an offshore drilling system is being used to drill a wellbore 11. The system includes an offshore vessel or platform 20 at the sea surface 12 and a subsea blowout preventer (BOP) stack assembly 100 mounted to a wellhead 30 at a sea floor 13. The platform 20 is equipped with a derrick 21 that supports a hoist (not shown). A tubular drilling riser 14 extends from the platform 20 to the BOP stack assembly 100. The riser 14 returns drilling fluid or mud to the platform 20 during drilling operations. One or more hydraulic conduit(s) 15 extend along the outside of the riser 14 from the platform 20 to the BOP stack assembly 100. The conduit(s) 15 supply pressurized hydraulic fluid to the BOP stack assembly 100. Casing 31 extends from the wellhead 30 into the wellbore 11.

Downhole operations, such as drilling, are carried out by a tubular string 16 (e.g., drill string) that is supported by the derrick 21 and extends from the platform 20 through the riser 14, through the BOP stack assembly 100, and into the wellbore 11. In this example, a downhole tool 17 is shown connected to the lower end of the tubular string 16. In general, the downhole tool 17 may include any suitable downhole tool(s) for drilling, completing, evaluating, and/or producing the wellbore 11 including, without limitation, drill bits, packers, cementing tools, casing or tubing running tools, testing equipment and/or perforating guns. During downhole operations, the string 16, and hence the tool 17 coupled thereto, may move axially, radially, and/or rotationally relative to the riser 14 and the BOP stack assembly 100.

The BOP stack assembly 100 is mounted to the wellhead 30 and is designed and configured to control and seal the wellbore 11, thereby containing the hydrocarbon fluids (liquids and gases) therein. In this example, the BOP stack assembly 100 includes a lower marine riser package (LMRP) 110 and a BOP or BOP stack 120. The LMRP 110 includes a riser flex joint 111, a riser adapter 112, one or more annular BOPs 113, and a pair of redundant control units or pods. A flow bore 115 extends through the LMRP 110 from the riser 14 at the upper end of the LMRP 110 to the connection at the lower end of the LMRP 110. The riser adapter 112 extends upward from the flex joint 111 and is coupled to the lower end of the riser 14. The flex joint 111 allows the riser adapter 112 and the riser 14 connected thereto to deflect angularly relative to the LMRP 110, while wellbore fluids flow from the wellbore 11 through the BOP stack assembly 100 into the riser 14. The annular BOPs 113 each include annular elastomeric sealing elements (e.g., packer elements) that are mechanically squeezed radially inward to seal on a tubular extending through the LMRP 110 (e.g., the string 16, casing, drill pipe, drill collar, etc.) or seal off the flow bore 115. Thus, the annular BOPs 113 have the ability to seal on a variety of pipe sizes and/or profiles, as well as perform a "Complete Shut-off" (CSO) to seal the flow bore 115 when no tubular is extending through the annular BOPs 113. According to some embodiments, each of the annular BOPs 113 includes one or more sensors 150. According to some embodiments, the sensors 150 are elastomer stress sensors configured to make stress measurements on the elastomeric sealing elements so that characterizations of their properties can be calculated. According to some embodiments, sensors 150 are pressure sensors that are configured to make pressure measurements on fluid within the flow bore 115. Each annular BOP 113 may include such pressure sensors positioned such that pressure can be measured above and below the elastomeric sealing element of each annular BOP 113. As will be described in further detail, infra, such pressure measurements can be recorded and analyzed so that a health of the elastomeric sealing elements can be evaluated.

According to some embodiments, the BOP stack 120 includes one or more annular BOPs 113 as previously described with sensors 150, choke/kill valves, and choke/kill lines. A main bore 125 extends through the BOP stack 120. In addition, the BOP stack 120 includes multiple axially stacked ram BOPs 121. Each ram BOP 121 includes a pair of opposed rams and a pair of actuators that actuate and drive the matching rams. In this embodiment, the BOP stack 120 includes four ram BOPs 121, namely an upper ram BOP 121 including opposed blind shear rams or blades for severing the tubular string 16 and sealing off the wellbore 11 from the riser 14, and the three lower ram BOPs 121 including the opposed pipe rams for engaging the string 16 and sealing the annulus around the tubular string 16. In other embodiments, the BOP stack (e.g., the stack 120) may include a different number of rams, different types of rams, one or more annular BOPs, or combinations thereof.

Figure 2:
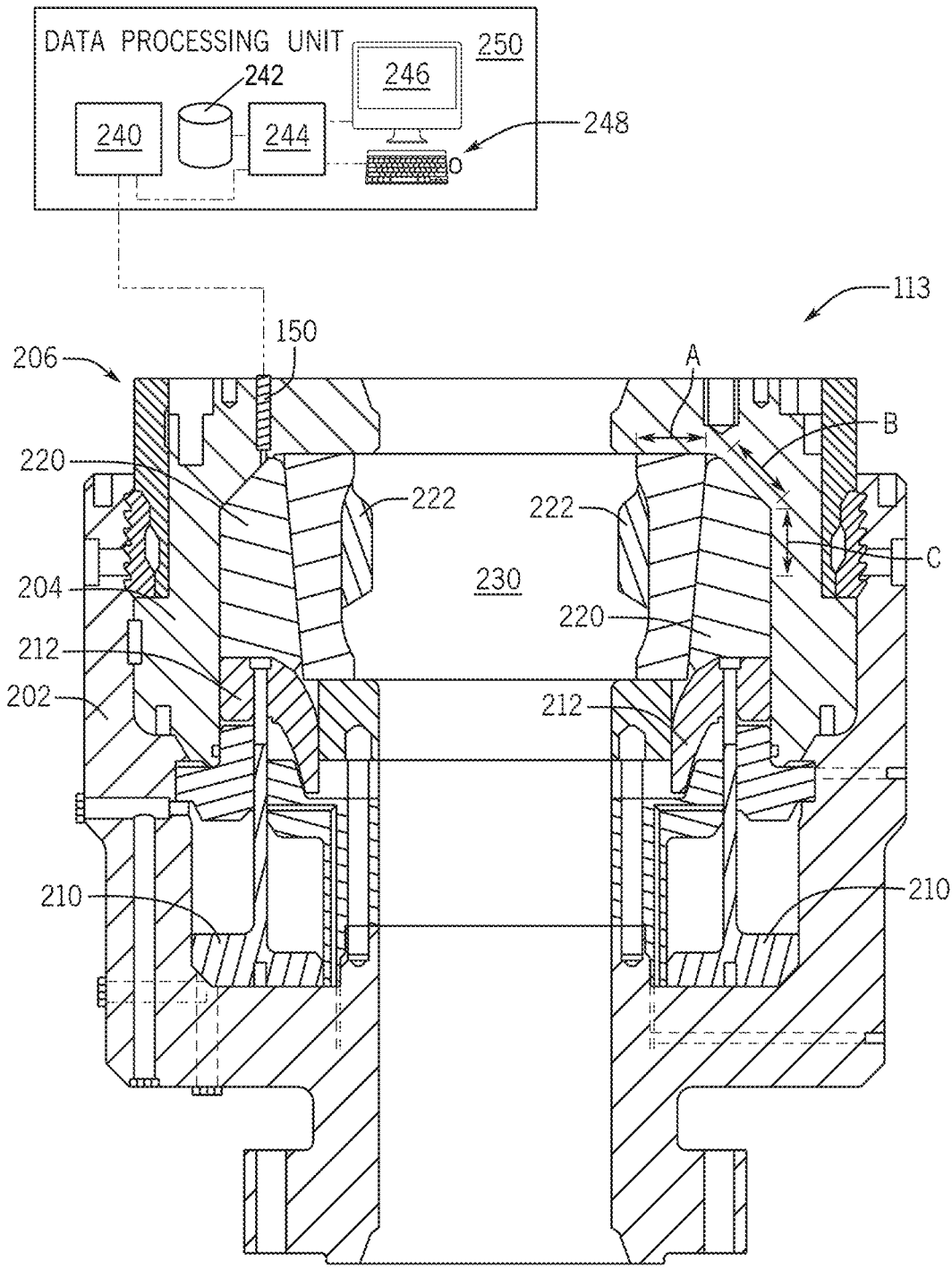
FIG. 2 is a cross-sectional view of an annular BOP that includes an elastomer characterization system, according to some embodiments.

FIG. 2 is a cross-sectional view of an annular BOP 113 that includes an elastomer characterization system (e.g., monitoring system), according to some embodiments. In this example, the annular BOP 113 includes two elastomer components: a donut 220 and a packer 222. In order to close and seal the annular BOP 113, hydraulic fluid enters below a piston 210 via body 202 and pushes it upwards. The piston 210 lifts a pusher plate 212, which in turn pushes on the donut 220. The pressure on the donut 220 forces the packer 222 radially inwards to form a seal with any tube within a BOP bore 230 (or sealing off the BOP bore 230, if there is no tube or pipe present). To re-open the annular BOP 113, the hydraulic fluid enters above the piston 210, thereby forcing it back downwards. In some embodiments, separate pistons can be used for opening and closing the annular BOP 113. In this case, the sensor 150 is an elastomer stress sensor 150 installed on a top of a body 206 (e.g., housing) within a casing 204 of the annular BOP 113. The sensor 150 is in contact with the donut 220. By being in contact with the donut 220, a contact pressure of the donut 220 can be monitored. As used herein, the term 'contact pressure' refers to an average normal stress exerted by the elastomer on a membrane of the sensor 150. According to some embodiments, the elastomer characterization system could be battery powered or power can be supplied from the offshore vessel or platform 20 or the BOP stack assembly 100 (both shown in FIG. 1). A data transmission/link can be wired to an acquisition system in a data processing unit 250, or make use of wireless transmission technology, such as acoustic telemetry (e.g., in subsea) or radio-frequency (e.g., on surface). The storage system 242 can be a part of the surface acquisition system or it could be embedded at the sensor level or at the BOP stack level.

Also shown in FIG. 2 is the data processing unit 250, which according to some embodiments, includes a central processing system 244, a storage system 242, communications and input/output modules 240, a user display 246 and a user input system 248. Input/output modules 240 are in data communication with the sensor 150, as shown by the dotted line. The data processing unit 250 may be located in the offshore vessel or platform 20 (shown in FIG. 1), or may be located in other facilities near the wellsite or in some remote location. According to some embodiments, the data processing unit 250 is also used to monitor and control at least some other aspects of drilling operations or other functions on the offshore vessel or platform 20 (shown in FIG. 1).

Figure 3:
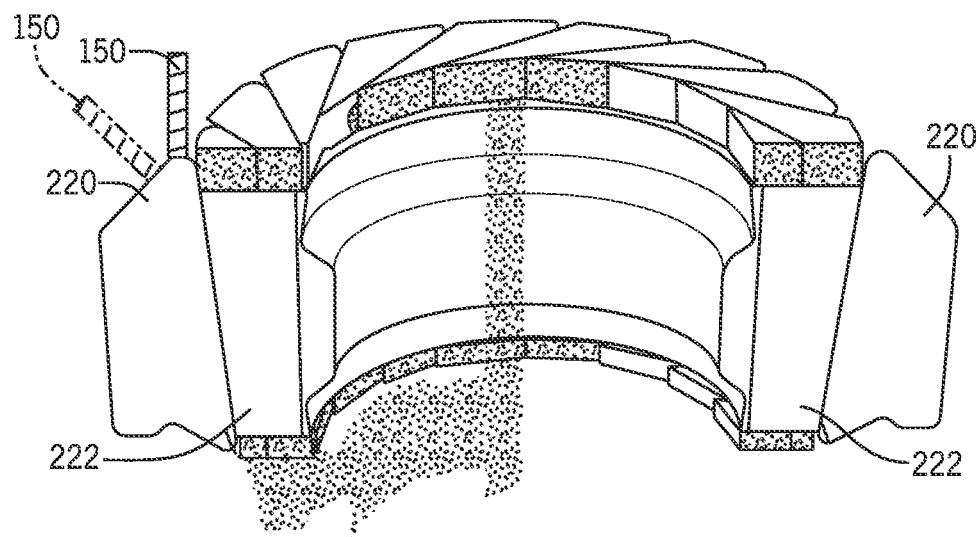
FIGS. 3 and 4 are diagrams showing results of finite element analysis of pressure within elastomeric components of an annular BOP during uncompressed and compressed states, respectively.
Figure 4:
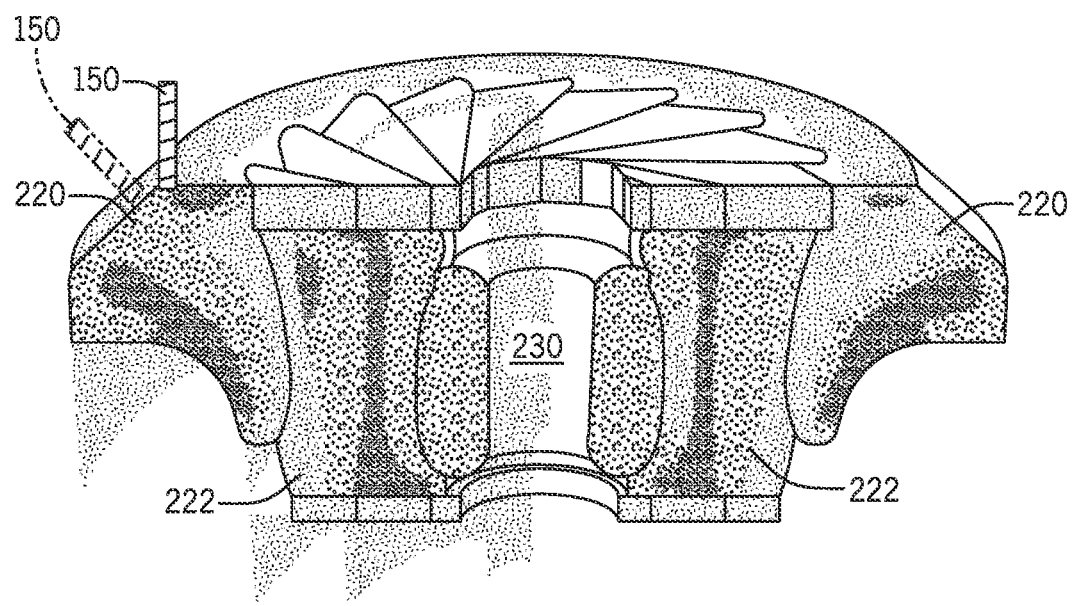

FIGS. 3 and 4 are diagrams showing results of finite element analysis of pressure within the elastomeric components of an annular BOP during uncompressed and compressed states, respectively. Also shown is the location of the sensor 150, which in this case is an elastomer stress sensor 150, installed on the top of the donut 220. It should be appreciated that the sensor 150 may be installed at a different location and/or orientation, such as at an angle (e.g., 45 degree angle) on top of the donut 220 as shown in dotted lines. The stress sensor 150 monitors the contact pressure changes during compression of the donut 220. As can be seen in FIG. 4, the contact pressure measured by the sensor 150 is equal to the contact pressure on the wellbore pipe within the BOP bore 230. The equivalence is due to the isotropic uncompressing characteristics of the elastomeric materials. Therefore, if the contact pressure as measured by the sensor 150 is not high enough to hold the wellbore pressure, a leakage will be likely to occur. According to some embodiments, the contact pressure measurement from the sensor 150 can be used to monitor the BOP packer elements in either closed or opened positions.

Stress relaxation behavior of the elastomer material is a factor that affects the contact pressure, and resulting contact pressure decay. According to some embodiments, the stress relaxation behavior is used as an indicator to monitor the condition and/or the service life of BOP packer elements (e.g., the donut 220, the packer 222). Elastomers used for packer elements are typically polymeric elastomers comprising various fillers, such as carbon black, clay and silica. See e.g., U.S. Pat. No. 9,616,659, and U.S. patent application Ser. No. 15/218,936, both incorporated herein by reference, which discuss typical compositions of BOP elastomers. Elastomers have strong Payne effects and stress soften effects (Mullin effects) due to the filler polymer interactions. This leads to a strong stress history effect of elastomer during deformation. For instance, the stress relaxation behavior tends to change slightly after each compression cycle.

Figure 5:
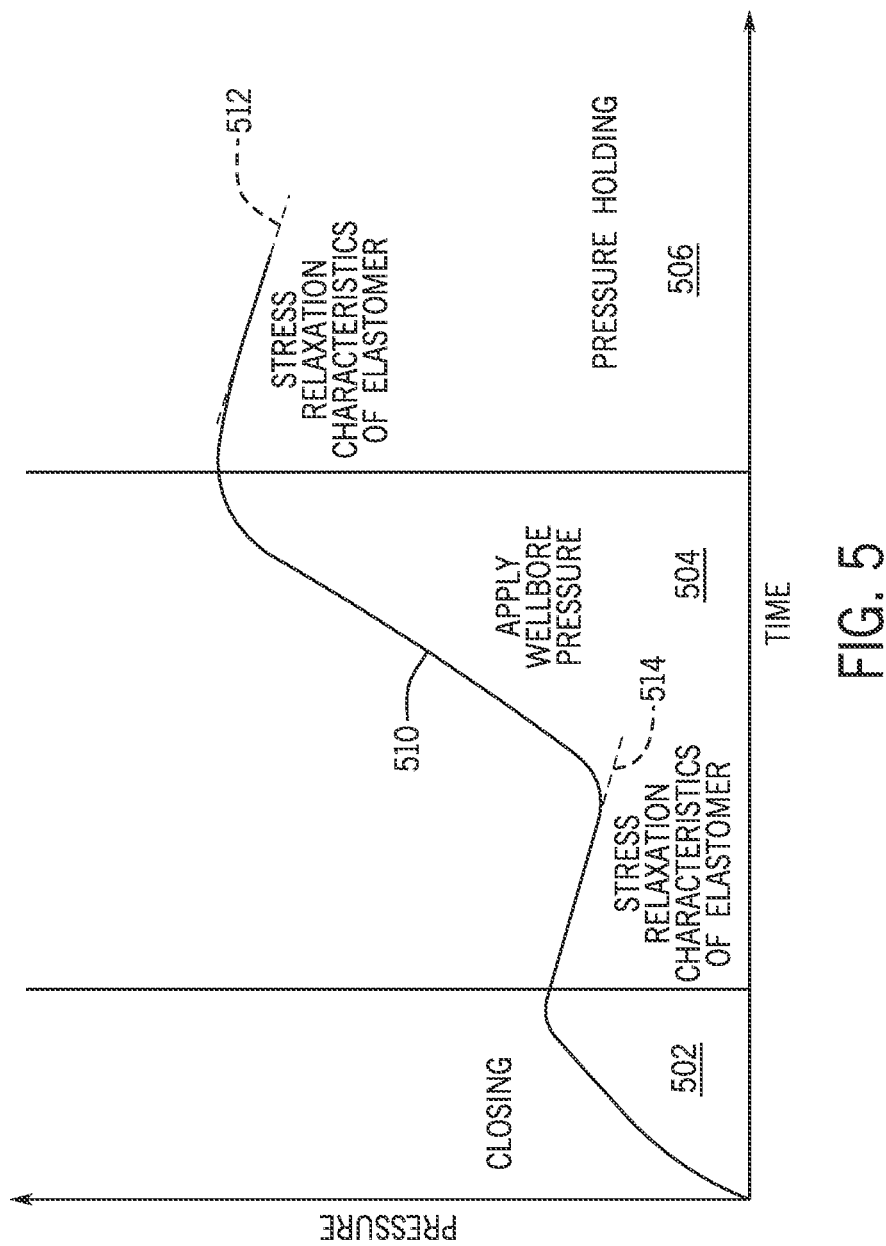
FIG. 5 is a plot illustrating changes in contact pressure in elastomer components of an annular BOP during closing and pressure holding.

FIG. 5 is a plot illustrating changes in the contact pressure in the elastomer components of an annular BOP during closing and pressure holding. The curve 510 shows a typical pressure curve, which could be measured for example using a sensor, such as sensor 150 shown in FIG. 2. As shown, there are typically distinct phases including the closing phase 502 which ends when the elastomer packer is fully engaged against the drill pipe. In phase 504, the well bore fluid pressure is applied. In phase 506, the well bore pressure is held by the annular BOP. Note that the slopes shown in FIG. 5 are for illustrative purposes and do not necessarily reflect the actual time scale. In phase 506, the stress relaxation characteristics of the elastomer are reflected in the slope shown by dashed line 512 (i.e., slope 512). Similarly, in phase 504, the stress relaxation characteristics of the elastomer are also reflected in the slope shown by dashed line 514. As discussed above, the stress relaxation characteristics, for example as measured by the slope 512, will typically be different after each compression cycle.

Figure 6:
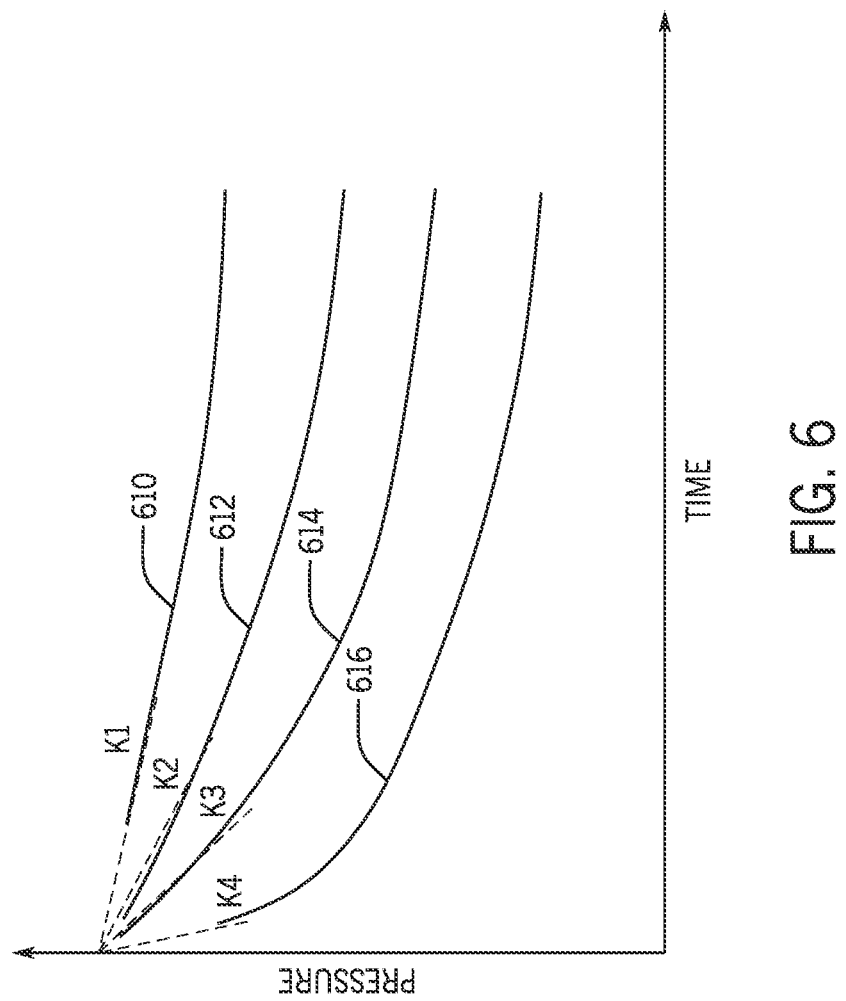
FIG. 6 is a plot illustrating contract pressure characteristics changing over time for elastomer components of an annular BOP.

FIG. 6 is a plot illustrating the contract pressure characteristics changing over time for the elastomer components of an annular BOP. The four curves 610, 612, 614 and 616 represent the contact pressure of an elastomer component of an annular BOP, such as via measurements taken by the sensor 150 shown in FIG. 2. The measurements are made during a "pressure holding" phase, such as phase 506 shown in FIG. 5. The slopes of each curve are shown by the dashed lines k1, k2, k3 and k4. The stress relaxation characteristic, and therefore the slopes k1, k2, k3 and k4, are affected by various factors over time, such as the number of closing/opening cycles, as well as exposure to pressures, temperatures, and chemicals. In general, it has been found that, over time, the stress relaxation slope becomes steeper. According to some embodiments, the unique stress relaxation characteristics as measured by the contact pressure by the sensor 150 is used to predict the state of the elastomer components. By monitoring the stress relaxation behavior of the contact pressure, the condition and/or the service life of the BOP packer elements can be monitored.

In addition to stress relaxation, other factors that can affect the contact pressure include chemical attack (such as mud or other wellbore fluids), thermal degradations, and high pressure extrusions. According to some embodiments, two or more of those factors (including stress relaxation) are combined together to provide an even stronger impact on the changes of the contact pressure, thereby further improving the monitoring of the elastomer material, under some circumstances.

According to some embodiments, measurements of the contract pressure on the elastomer material during other BOP phases, such as during the closing phase (e.g., phase 502 in FIG. 5) and/or the pressurization phase (e.g., phase 504 in FIG. 5) can be used to learn information regarding BOP packer health. For example, the contact pressure can be measured versus a piston closing position during the closing step. For the pressurization phase, the contact pressure could be measured versus the well pressure. For further details on measuring the piston position, see e.g., U.S. Pat. App. Publ. 2015/0007651 and U.S. Pat. App. Publ. 2016/0123785, both of which are incorporated by reference herein.

According to some embodiments, data collection on multiple cases is combined with analysis to set initial criteria on the service life. The criteria can be further refined using algorithms/data science and statistics. The data analysis could be based on actual physics-based parameters and/or from multiple parameters with statistical behavior considered as inputs for machine learning algorithm(s).

According to some embodiments, the sensor 150 (e.g., shown in FIG. 2) can be selected from various suitable types of devices. For example, the sensor 150 may be a piezoelectric type sensor, such as an integrated electronic piezoelectric (IEPE) pressure sensor. One suitable type of IEPE is a Type 211B IEPE, which is a general purpose pressure sensor that measures transient and repetitive dynamic events in a wide variety of applications. Type 211B IEPE sensors typically have low impedance, voltage mode, high level voltage signal, high natural frequency, and are acceleration compensated. They are well suited for fast transient measurement under varied environmental conditions.

Figure 7:
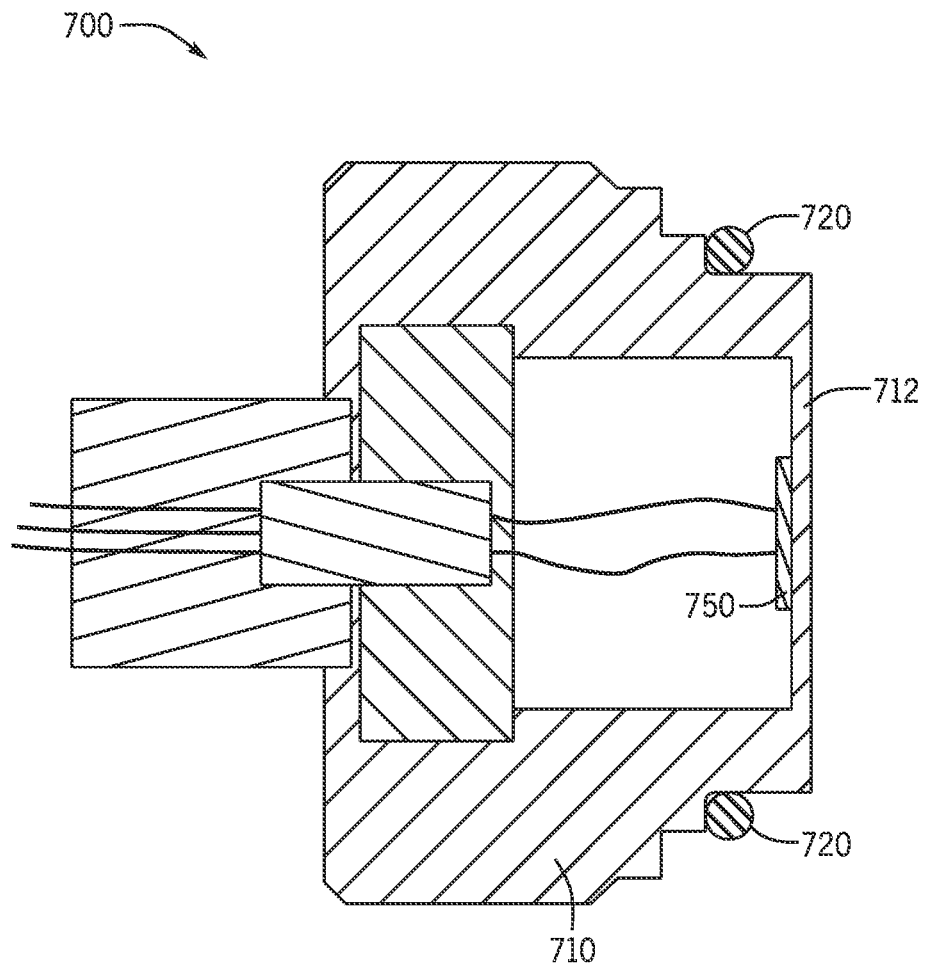
FIG. 7 is a diagram illustrating a strain gauge configured for making contact pressure measurements on elastomer components of an annular BOP, according to some embodiments.

Other types of sensors may be used to make contact pressure measurements on the elastomer components of the annular BOPs. FIG. 7 is a diagram illustrating a strain gauge that is configured to obtain the contact pressure measurements on the elastomer components of the annular BOPs, according to some embodiments. A sensor 700 (e.g., strain gauge sensor) can be used to make contact pressure measurements, and can be substituted with or used in addition to the sensor 150 shown and described elsewhere herein. The sensor 700 has a body 710 that includes a membrane 712 (e.g., metallic membrane). The sensor 700 can be mounted within an annular BOP such that an outer surface of the membrane 712 is in direct contact with an elastomer component of the annular BOP, such as shown and described with respect to the sensor 150. Sealing means, such as O-ring 720, can be used for the mounting. A strain gauge 750 is mounted to an inner surface of the membrane 712, as shown. When the membrane 712 is deformed due to a contact pressure from the elastomer component, the strain gauge 750 is also deformed. The deformation of the strain gauge 750 can be measured (e.g., by altering an electrical resistance) and recorded using known techniques. Although piezoelectric type sensors and strain gauge sensors have been described herein, according to some embodiments other types of sensor can be used. Other types of piezoelectric type sensors can be used, including voltage-transient response and frequency-change response quartz sensors. According to some embodiments, a piezo-resistive sensor can be used, such as based on metal foil strain, silicon lattice strain, or metallic nanowire strain. Other sensing techniques can also be used, such as a sensor that makes displacement measurements with ultrasonic transducers. Other types of sensors that could be used to measure contact pressure include inductive sensors and optical (opto-electronic) sensors.

Although the discussion above has included the use of one sensor only, according to some embodiments, multiple sensors can be installed on a single BOP. In some examples, the sensors are positioned at different circumferential positions. Multiple sensors spaced apart circumferentially could aid in cases when the drill pipe is potentially eccentrically positioned, which might result in misleading measurements by a single sensor. According to some embodiments, the sensor or sensors can be positioned at other positions than shown in FIG. 2. In the design shown in FIG. 2, for example, the sensor(s) can be positioned at locations indicated by dotted arrows A, B and/or C. The positioning of the sensor(s) should be selected based on a number of factors including the particular design of the BOP. Note that in the case of the annular BOP shown in FIG. 2, measurements from a sensor mounting to the location C might be obstructed by the pusher plate 212 when the annular BOP is nearly or fully in the closed (compressed) position.

According to some embodiments, one or more sensors can be embedded in the elastomer either by over molding during manufacturing or micromachining a path through the material. For further details of embedding sensors in the elastomer material, see US. Pat. Publ. No. 2017/0130562, which is incorporated by reference herein.

According to some embodiments, multiple sensors can be used for redundancy to ensure high reliability of the BOP equipment being monitored. The multiple sensors can be: (1) the same type of sensors mounted in similar and/or different locations; and/or (2) different types of sensors mounted in similar and/or different locations. The use of multiple sensors can provide higher measurement quality by cross-correlation and measurement error compensation.

Figure 8:
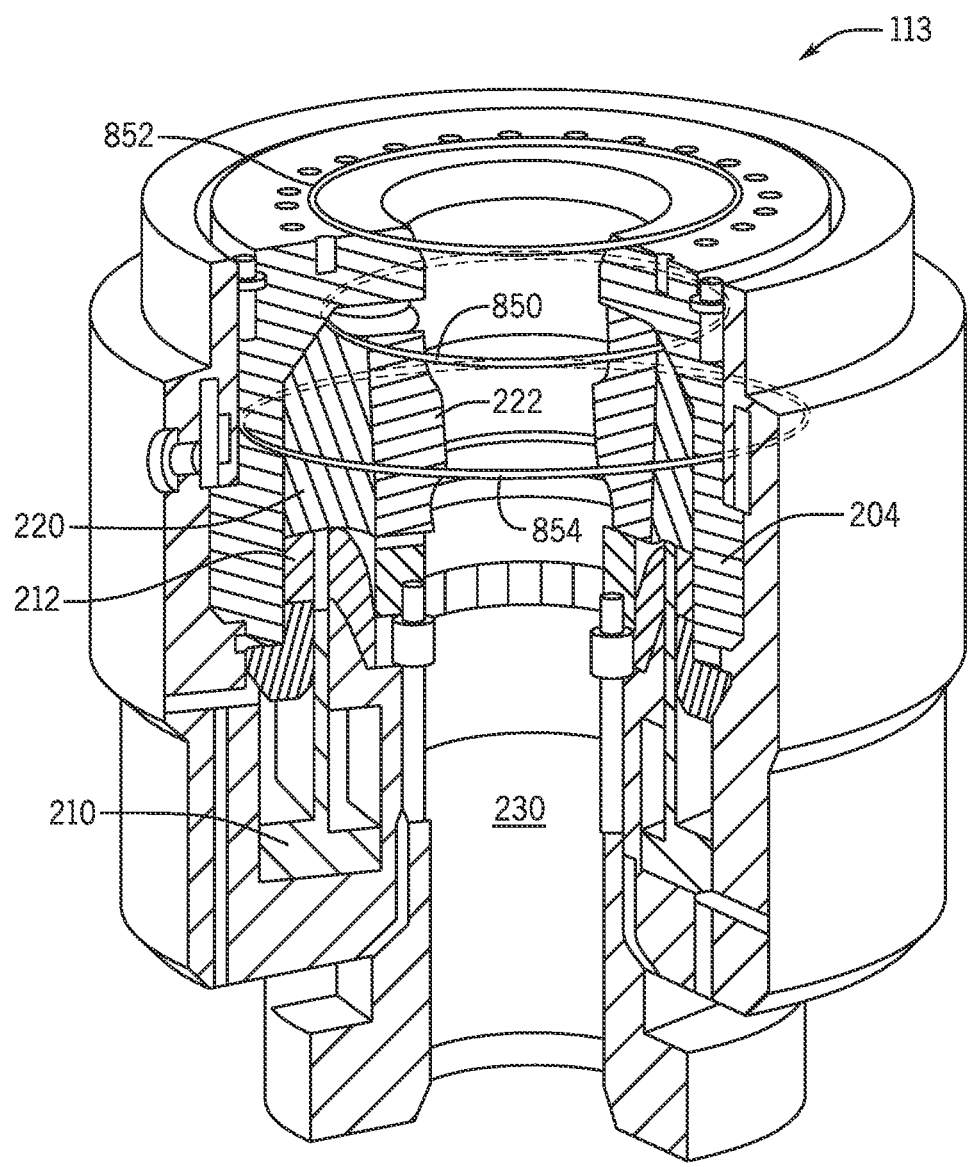
FIG. 8 is a diagram illustrating an annular BOP configured with an elastomer characterization system, according to some further embodiments.

FIG. 8 is a diagram illustrating an annular BOP configured with an elastomer characterization system (e.g., monitoring system), according to some further embodiments. In the case of FIG. 8, stress variations in the donut 220 of the annular BOP 113 are measured using optical fiber-based sensors. An optical fiber 850 is located in contact with the donut 220 and is configured with Bragg gratings for distributed Bragg grating measurements. The optical fiber 850, which can be positioned in a groove on the inner surface of the casing 204, can be used to detect lengthening of the circumference of the donut 220, which can be calibrated to the contact pressure (or stress). Other locations can be used to deploy optical fiber-based Bragg grating devices due to the high sensitivity of such devices. For example, optical fibers 852 and 854 are shown positioned in contact with the casing 204, but not directly in contact with an elastomer component of the annular BOP 113. Bragg grating measurements can be used to detect minor deformations (elongations) in the circumference of the casing 204, which through calibration can be related to contact pressure or stress values in the elastomer components. According to some embodiments, the fiber Bragg grating measurements can be used to monitor similar quantities as the ones described when using the pressure type and strain type sensors for monitoring elastomers in BOPs including: strain/stress versus piston position when closing the BOP; strain/stress vs. well pressure when applying wellbore pressure; and strain/stress over time at wellbore pressure plateau.

According to some embodiments, a combination of several sensor technologies is used to enhance measurement robustness for reliability (redundancy) and measurement uncertainty and stability. Combining measurements from two or more types of sensors provides these benefits since the different sensors generally have different calibration errors, drift, and performance.

According to some embodiments, any of the sensor(s) used (e.g., pressure, strain, fiber optic, etc.) can be calibrated prior to use. In a laboratory or other controlled setting, the sealing pressure of the elastomeric component (i.e., the pressure the component exhorts on a sealing object, such as a drill pipe) is measured directly and used to calibrate the readings from the sensor(s). Measures of stress (normal and/or shear), strain (deformation), and pressure from any of the sensors used can be calibrated back to the sealing pressure. Similarly, even though a particular sensor type may be configured to measure a particular physical property, the sensor's measurements can be related to and calibrated to monitor sealing pressure of the elastomeric components. For example, a piezoelectric sensor may measure strain (bending) on a membrane, which can be related to stress in a direction normal to the surface of the membrane. The sensor can be calibrated using fluid pressure. Although measurement values of the sensor may be expressed in terms of pressure (e.g., psi), the sensor's readings can be related to and calibrated for stress in the normal direction. Other types of sensors and/or positioning can be used (e.g., measuring "shear stress" in a tangential direction), but similarly related back to normal stress and sealing pressure.

According to some embodiments, the measurements and the sensor devices described herein can be used to analyze, investigate, and in some cases determine likely causes of failure in cases where one or more components of a BOP experience a failure. It has been found that recordings of measurements made of the contact pressure and/or other measurements can be used to keep track of various conditions and events that can be related to elastomer lifespan in the BOP. Examples of such conditions and events include: the number of BOP actuations (e.g., during fatigue tests and pressure tests), the number of stripping operations performed, and even the number of tool joints that have passed through the BOP during such stripping operations. By looking back at such recordings after a failure has occurred, a better understanding of how and why the failure occurred can result.

According to some embodiments, the techniques described herein can also be applied to other types of BOPs, such as ram type BOPs. In general, the techniques described herein are applicable to any type of BOP or other equipment (e.g., rotating control devices) having elastomer components, such as elastomer packers that are initially compressed to establish a first contact pressure and then further energized by wellbore pressure to form a sealing surface. While the techniques are applicable to nearly any type of elastomer packers used in BOP applications, they have been found to be especially suitable for annular packers, variable bore ram and flex ram packers, where a larger deformation of the elastomer material is used to establish the contact pressure and to form a seal under wellbore pressure. According to some embodiments, the elastomer material being monitored undergoes at least 10 percent of deformation in uniaxial, planar, or biaxial mode. According to some other embodiments, the elastomer material undergoes at least 20 percent deformation. In some cases, the elastomer material undergoes at least 50 percent deformation, and in some cases at least 200 percent deformation.

Figure 9:
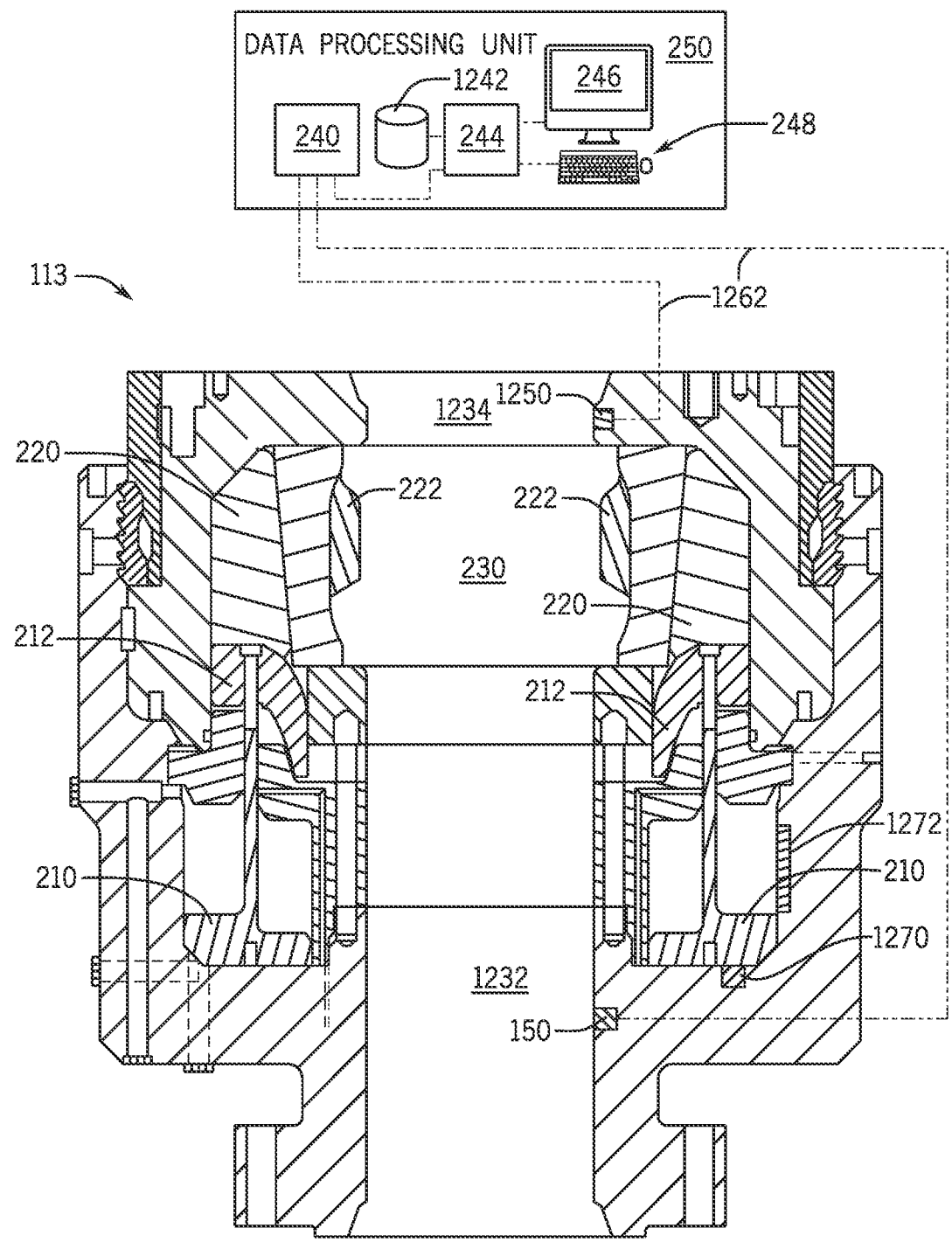
FIG. 9 is a cross-sectional view of an annular BOP that includes pressure sensors for use in an elastomer health monitoring system, according to some embodiments.

FIG. 9 is a cross section of an annular BOP that includes pressure sensors for use in an elastomer health monitoring system (e.g., monitoring system), according to some embodiments. In this example, the annular BOP 113 is similar or identical to that shown in FIG. 2 in many respects. Note that the bore 230 in FIG. 9 can correspond to the flow bore 115 in the LMRP 110 and/or the main bore 125 in the BOP stack 120, as shown in FIG. 1. In these embodiments, the sensor 150 is a pressure sensor installed within the annular BOP 113 as shown and is configured to measure fluid pressure in a region 1232, which is below the packer 222 (e.g., the sealing element of the annular BOP 113). According to some embodiments, a second pressure sensor 1250 is installed as shown and is configured to measure fluid pressure in a region 1234 that is above the packer 222.

Also shown in FIG. 9 is the data processing unit 250, which is similar or identical to the data processing unit 250 shown in FIG. 2 and includes a storage system 1242. Input/output modules 240 are in data communication with the sensor 150, as shown by the dotted line. The data processing unit 250 may be located in the offshore vessel or platform 20 (shown in FIG. 1), or may be located in other facilities near the wellsite or in some remote location. According to some embodiments, the data processing unit 250 is also used to monitor and control at least some other aspects of drilling operations or other functions on the offshore vessel or platform 20 (shown in FIG. 1).

According to some embodiments, the sensors 150 and 1250 are either battery powered, supplied by power from the offshore vessel or platform 20 or from the BOP stack assembly 100 (both shown in FIG. 1). A data transmission/link, represented by dotted lines 1262, can be wired to an acquisition system in the data processing unit 250, or make use of wireless transmission technology, such as acoustic telemetry (e.g., in subsea) or radio-frequency (e.g., on surface). The storage system 1242 can be a part of the surface acquisition system, or it may be embedded at the sensor level or at the BOP stack level.

According to some embodiments, the annular BOP 113 includes the ability to determine the position of the piston 210 within the annular BOP 113, such as during the closing process. In some cases, an ultrasonic technique can be used. In such cases, a sensor module 1270 is provided that includes an ultrasonic transducer, a temperature sensor, and a pressure sensor. Further details of using ultrasonic techniques for determining location of a piston in a subsea device is provided in co-owned U.S. Pat. Nos. 9,163,471, 9,187,974, and 9,804,039, which are incorporated herein by reference. According to some other embodiments, a coil assembly 1272, together with the movable piston 210, forms a linear variable differential transformer (LVDT). Further details of using LVDT techniques for determining location of a movable element within a container is provided in co-owned U.S. Pat. App. Publ. 2016/0123785, which is incorporated herein by reference.

Figure 10:
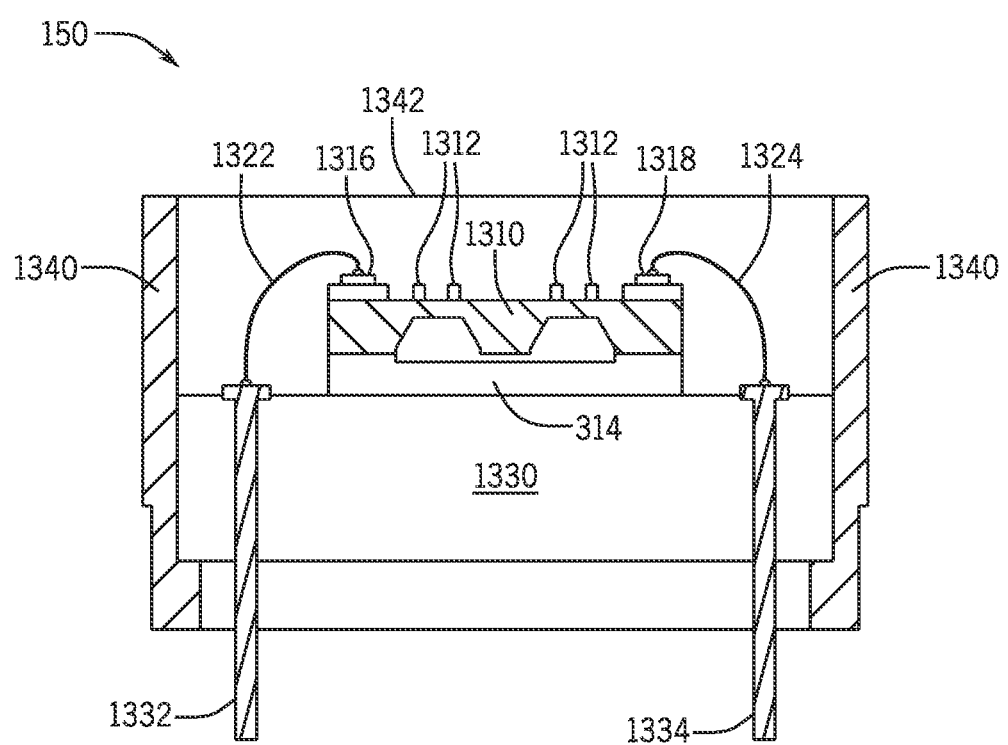
FIG. 10 is a schematic diagram showing aspects of a pressure sensor for use in an elastomer health monitoring system, according to some embodiments.

FIG. 10 is a schematic diagram showing aspects of a pressure sensor for use in an elastomer health monitoring system (e.g., monitoring system), according to some embodiments. The sensor is labeled as 150, although both pressure sensors 150 and 1250 shown in FIG. 9 could use a design that is shown in FIG. 10. The sensor 150 in FIG. 10 is a silicon-on-insulator (SOI) pressure gauge. A silicon sensor chip 1310 is shown mounted to a glass pedestal 1314. A silicon piezo resistor(s) 1312 is shown, which are electrically connected with metal contacts 1316 and 1318. The metal contacts 1316 and 1318 are connected to wires 1322 and 1324 and contact pins 1332 and 1334, respectively. The sensor structure is sealed by a header glass 1330, a housing wall 1340 and a diaphragm 1342. In operation, the diaphragm 1342 is exposed to the fluid pressure (e.g., in regions 1232 and 1234 shown in FIG. 9). The pressure is transmitted through the diaphragm 1342 and applied to an outer surface of the silicon chip 1310. Mechanical stress on the chip 1310 is measured through the piezo resistor(s) 1312. Sensors such as shown in FIG. 10 can have outstanding metrology. According to some embodiments, the sensors 150 and 1250 are configured to monitor changes in pressure in the range of a few Pa [mpsi] per second, and at the same time able to read pressure values up to 138 MPa [20000 psi], in a temperature range from 0 degrees Celsius to 150 degrees Celsius. According to some embodiments, the dynamic response is equal to or better than 100 mpsi within a 1-5 minutes, and the gauge resolution of 1-15 mpsi @ 1 Hertz (Hz).

According to some embodiments, a suitable pressure gauge is used, which has at least the following specifications: Pressure range (FS), atm—10 kpsi; Temperature range, 85 degrees Celsius—125 degrees Celsius; Accuracy, Typ. $1\times10^{-3}$ FS; Repeatability, Typ. $1\times10^{-4}$ FS to $1\times10^{-3}$ FS; Resolution, Typ. $1\times10^{-5}$ FS to $1\times10^{-3}$ FS; Dynamic response to Pressure transient, Stabilization within $10^{-4}$ FS<1-10 s; Dynamic response to Temperature transient, Stabilization within $10^{-4}$ FS<10-30 s; Short term stability (0-4H), <100-1000 mpsi; Medium term stability (4-14H), 1-10 psi; Long term stability (>100H), 1-100 psi; Data rate, 1 Hz-10 Hz; and Reliability, 1 years—155 degrees Celsius.

According to some embodiments, one or more of the pressure gauges used has at least the following specifications: Pressure range (FS), 10 kpsi-30 kpsi; Temperature range, 125 degrees Celsius—200 degrees Celsius; Accuracy, Typ. range $0.5\times10^{-4}$ FS-$2\times10^{-4}$ FS, Max. $3\times10^{-4}$ FS; Repeatability, Typ. $1\times10^{-5}$ FS to $1\times10^{-4}$ FS; Resolution, Typ. $1\times10^{-6}$ FS to $1\times10^{-5}$ FS; Dynamic response to Pressure transient, Stabilization within $10^{-4}$ FS<0.1-10 s; Dynamic response to Temperature transient, Stabilization within $10^{-4}$ FS<1-30 s; Short term stability (0-4H), <1-10 mpsi; Med. term stability (4-14H), 0.1-1 psi; Long term stability (>100H), 0.1-1 psi; Data rate, 1 Hz-2000 Hz; and Reliability, 5 years—150 degrees Celsius.

According to some embodiments, the pressure sensors 150 and 1250 are further configured to provide temperature measurements, which can be used for pressure sensor calibration. Note that although a SOI-type pressure sensor is shown in FIG. 10, according to some other embodiments, one or more other known types of pressure sensors are used for the sensors 150 and/or 1250. Examples of other types of sensors that could be suitable include: other types of pressure quartz transducers, piezoelectric resonant pressure sensors, optic fiber sensors, metallic alloy-based strain foil gauges, metallic nanowire based strain sensors, and force sensors for example based on a strain foil gauge. According to some embodiments, sensors 150 and/or 1250 are of a type and design such as used in Schlumberger's Signature CQG Crystal Quartz Gauge tool and/or Schlumberger's MDT Modular Formation Dynamics Tester.

Figure 11:
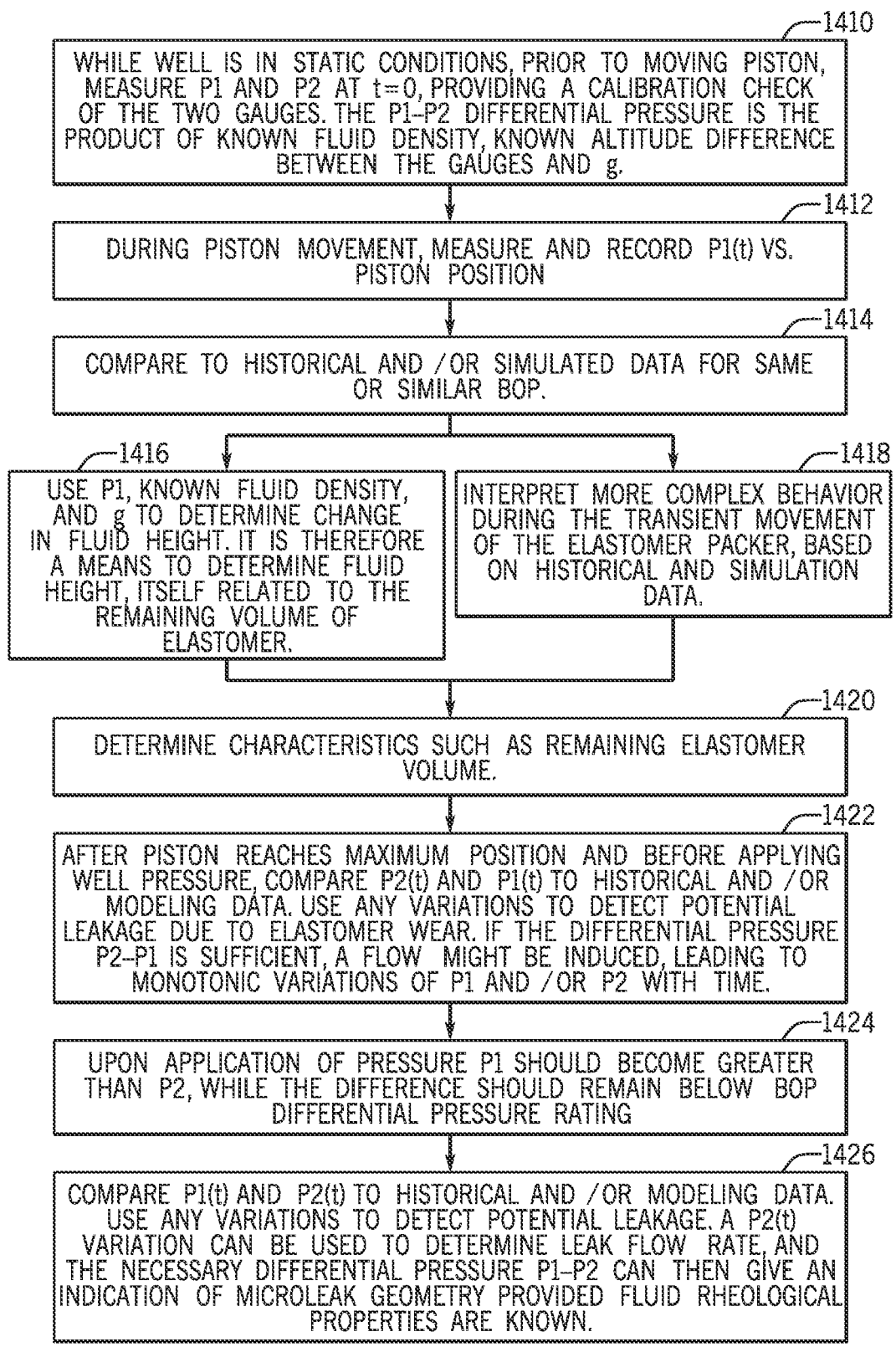
FIG. 11 is a block diagram showing aspects of determining BOP elastomer health based on fluid pressure measurements, according to some embodiments.

FIG. 11 is a block diagram showing aspects of determining BOP elastomer health based on fluid pressure measurements, according to some embodiments. It is assumed that both the geometry and the properties of the fluid that fills the bore 230, the flow bore 115, and the main bore 125, shown in FIGS. 1 and 9, are known. The block diagram of FIG. 11 illustrates how to determine elastomer health properties based on the pressure measurements during a regular subsea BOP in-situ pressure test. Two pressure measurement sensors are used: $P1(t)$ which is positioned below the BOP sealing element (corresponding to the sensor 150, shown in FIG. 9); and $P2(t)$ which is positioned above the BOP sealing element (corresponding to the sensor 1250 shown in FIG. 9). During the pressure test, measurements are recorded from both pressure sensors during both (1) the piston movement phase, and (2) while the well pressure is being applied.

In block 1410, before moving the piston and while the well is in static conditions, $P1-P2$ ($t=0$) measurements are used to provide an in-situ calibration check for the two sensors, since this differential pressure is the product of known fluid density, known altitude difference between the sensors and the force of gravity on Earth ($g$).

In block 1412, during the movement of the piston for closure of the BOP, $P1(t)$ vs. piston position is monitored and recorded. Note that as described supra, ultrasonic and/or LVDT are examples of methods that can be used for determining the piston position. In block 1414, the $P1(t)$ versus piston position measurements are then compared to historical and/or simulated data obtained with the same or similar BOPs. Provided the fluid properties are known, as the elastomer wears and degrades, variations between the measured and historical and/or simulated $P1(t)$ versus piston position data will tend to change and become characteristic of the remaining elastomer volume (Block 1420).

Blocks 1416 and 1418 illustrate two examples of how remaining elastomer volume could be determined. In block 1416, a change (e.g., an increase) in the pressure P1, once the piston has reached its final position, can be used to determine the remaining volume of the elastomer. P1 is a product of the known fluid density, g, and the unknown fluid column height increase. Solving for the fluid column height increase can then be related to the remaining volume of elastomer.

Figure 12:
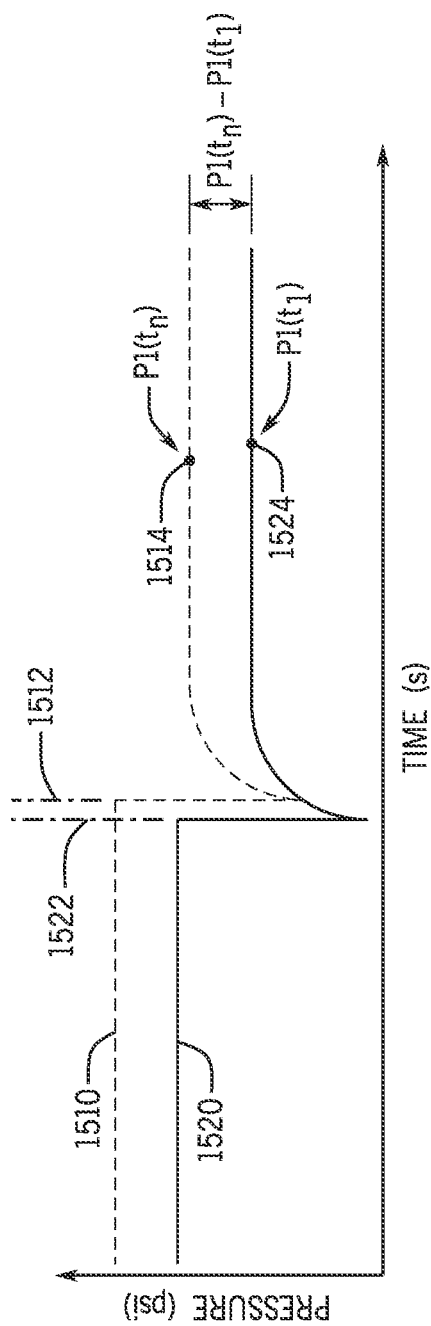
FIG. 12 is a plot illustrating aspects of determining remaining elastomer volume by comparing pressure measurements, according to some embodiments.

FIG. 12 is a plot illustrating aspects of determining remaining elastomer volume by comparing pressure measurements, according to some embodiments. A first order calculation can be used, which takes into account the density change due to the replacement of the drilling fluid by the elastomer in the BOP wellbore section. The relationship is based on the change over time measured at pressure sensor P1: $k0 + k1*((P1(t_h)-P1(t_1))/(\rho*g)) + k2*((P1(t_h)-P1(t_1))/(\rho*g))^2$ $k3*((P1(t_h)-P1(t_1))/(\rho*g))^3$ (volume loss). P1 is a pressure sensor below the elastomer such as sensor 150, $\rho$ is drilling fluid density, $g$ is gravitational acceleration, $k0$, $k1$, $k2$, and $k3$ are geometric coefficients related to the packer. $t_h$ and $t_1$ are times when the BOP is closed. $t_h$ is a historical time, for example when the elastomer packer is in a new or otherwise well-known state, while $t_1$ is the time of the periodic check. In FIG. 12, both curves 1510 and 1520 show recorded pressure measurements taken in a central bore of the BOP, such as by the sensor 150 shown in FIG. 9. Curve 1510 reflects measurements made at a historical time (e.g. when the elastomer packer is in a new or otherwise well-known state), while curve 1520 reflects a measurement made recently or currently. The BOP closure is shown at times 1512 and 1522 for curves 1510 and 1520, respectively. Measurement points 1514 and 1524 show the P1 measurements for curves 1510 and 1520, respectively. The pressure differential $P1(t_h)-P1(t_1)$ can be used, for example, in the relationship described above to estimate the elastomer volume loss. Note that according to some embodiments, the volume loss is estimated for an open BOP (no strain on the elastomer). The following is an illustrative example for volume loss determination: $P1(t_0)-P1(t_1)=150$ mpsi, $\rho=1000$ kg/m3, $g=9.81$ m/s$^2$, $k0=0$, $k1=0$, $k2=0.25$, $k3=0.75$, volume loss 3 liters (2.10e-3 m$^3$).

Figure 13:
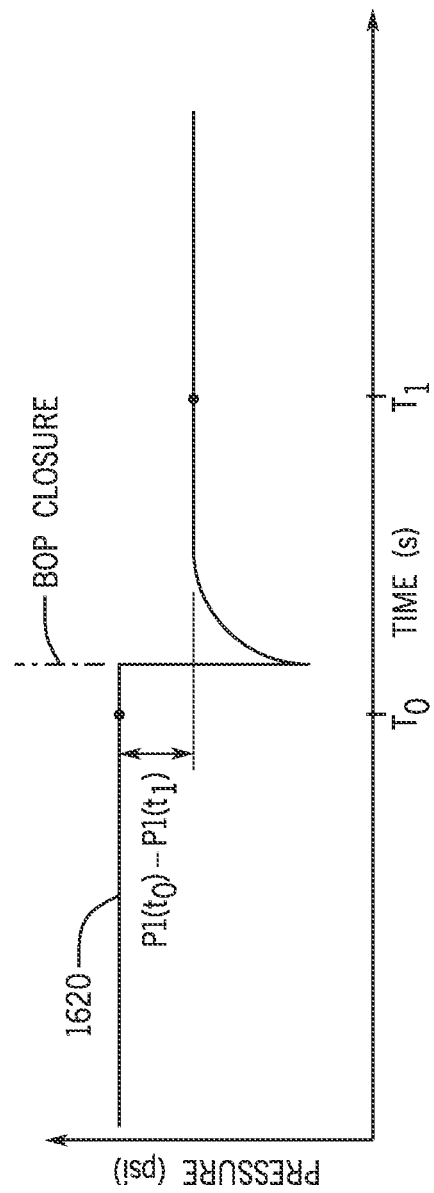
FIG. 13 is a plot illustrating aspects of detecting proper sealing of the BOP, according to some embodiments.

FIG. 13 is a plot illustrating aspects of detecting proper sealing of the BOP, according to some embodiments. In this case, the P1 measurements can be used to detect proper sealing of the BOP. Note that this technique can be used for sealing integrity prior to additional well bore pressure being applied, rather than as a method for leak detection at maximum well bore pressure. Curve 1620 reflects P1 measurements made before, during, and after a BOP closure. A condition can be defined as follows: $P1(t_0)-P1(t_1)>\Delta P\_min$. P1 is the pressure measured in the central bore of the BOP below the sealing element, such as by sensor 150 shown in FIG. 9. $\Delta P$ min is a minimum differential pressure threshold/drop to ensure sealing detection. $t_0$ and $t_1$ are respectively times when the BOP is open and closed. If $P1(t_0)-P1(t_1) \leq \Delta P\_min$, then improper sealing of the BOP is indicated prior to application of additional pressure from below the BOP. Following is an illustrative example for sealing detection: $P1(t_0)-P1(t_1)=150$ mpsi, $\Delta P\_min=100$ mpsi. Therefore, the BOP is sealed with no additional well bore pressure.

Referring again to FIG. 11, alternatively or in addition to block 1416, in block 1418, more complex behaviors during the transient move of elastomer packer can be interpreted based on historical and/or simulation data.

In block 1422, after the piston has reached its maximum position and before applying well pressure, $P2(t)$ and $P1(t)$ can be compared to historical and/or modeling data. In an ideal case, both should remain constant. However, if there is a leakage path due to elastomer wear, and if the differential pressure P2-P1 is sufficient, a flow would be induced, leading to monotonic variations of P1 and/or P2 with time.

In block 1424, once well pressure is applied, P1 becomes greater than P2. Note that the difference will remain below the BOP differential pressure rating. In block 1426, $P1(t)$ and $P2(t)$ are compared to historical and/or modeling data. Both should ideally remain constant. However, in case there is a leakage, the $P2(t)$ variation can be used to determine flow rate (see example 1 of numerical application below), and the necessary differential pressure P1-P2 can then give an indication of microleak geometry provided fluid rheological properties are known (see example 2 of numerical application below).

Example 1—using P2(t) to determine leakage flow rate. Assumptions: annulus area: A=700 cm2 (20-inch riser and 5-inch drill pipe); fluid density: ρ=1500 kg/m3; flow rate: Q=3.5 mL/s=210 mL/min.

$$\frac{\delta P_2}{\delta t} = \rho g \frac{\delta h}{\delta t} = \rho g \frac{Q}{A}$$

that numerically gives a pressure variation of 45 Pa in one min (7 mpsi/min). This variation can be detected with high quality SOI pressure sensors.

Example 2—using P1-P2 to determine leak diameter. Assumptions: P1-P2=69 MPa (10000 psi); flow rate: Q=3.5 mL/s; Newtonian fluid with fluid viscosity: =0.1 Pas; cylindrical microleak through the elastomer with a length of: 1=30 cm; laminar flow (valid for a liquid in a small diameter leak path).

According to Poiseuille's law the radius r of the microleak channel to the power 4 can be expressed as:

$$r^4 = \frac{8\eta l Q}{\Delta P \pi}$$

that numerically gives a radius of 250 microns for the corresponding micro leak in the elastomer.

Note that unlike with conventional leak detection systems, some of the pressure measurements described herein will benefit from relatively fast and high-resolution pressure sensors. For example, during the BOP piston movement, the pressures will change drastically (typically several thousand of psi in a few seconds) and the dynamic effects (e.g., fluid temperature variation and gauge response) could jeopardize the pressure data interpretation during the first minutes.

Therefore, to properly examine the entire leak signature, the pressure sensor should be highly stabilized (within a few mpsi) after a few minutes. Furthermore, if we assume an acceptable leak detection threshold of 3.5 mL/s (see example 1), the pressure sensor should be capable to resolve a variation of a few mpsi. Based on the foregoing, according to some embodiments, the pressure sensors used have a dynamic response of within 100 mpsi in a few minutes, and a gauge resolution of 1-15 mpsi @ 1 Hz.

Figure 14:
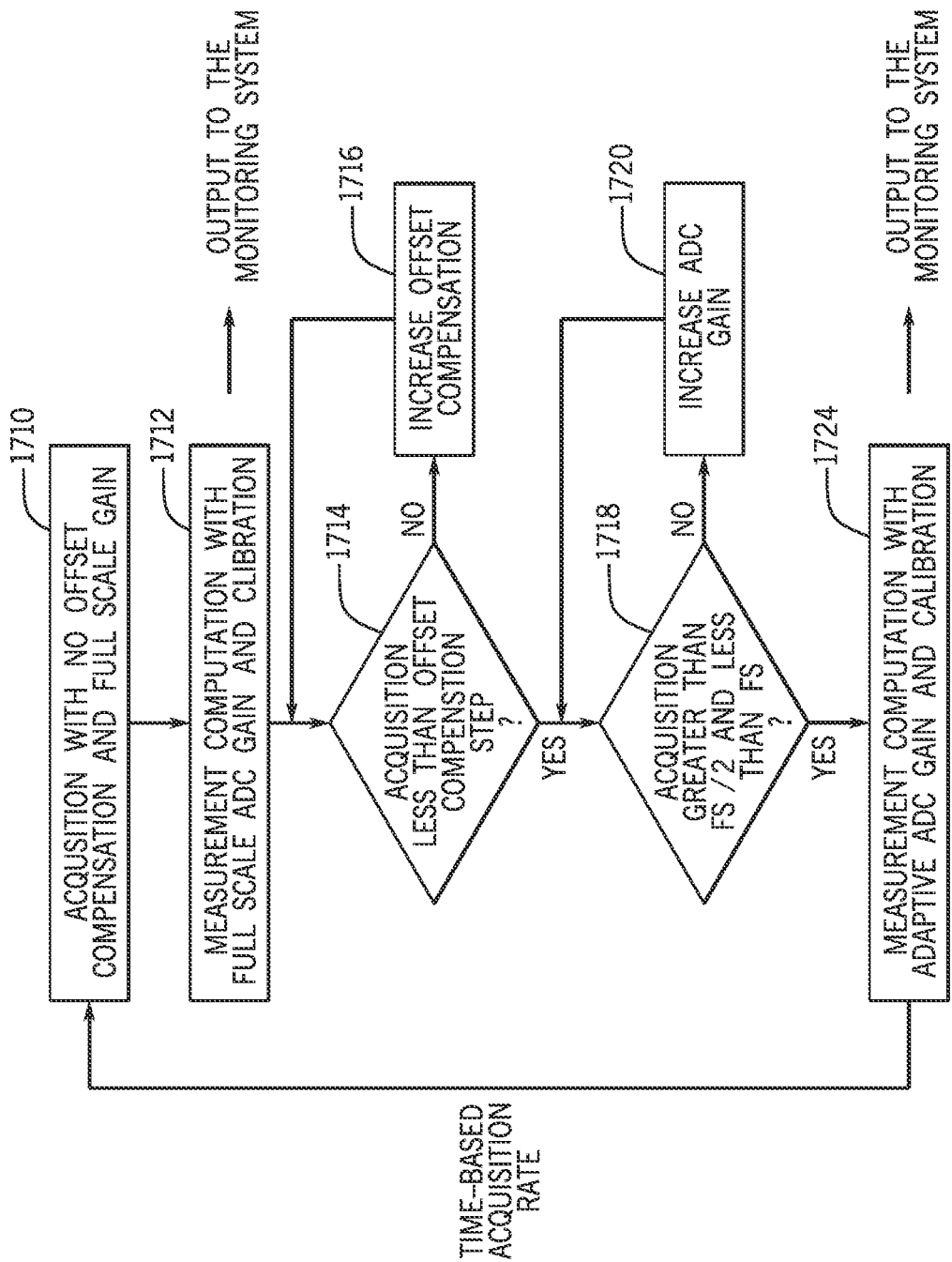
FIG. 14 is a block diagram illustrating signal-processing techniques used to enhance measurements from one or more pressure sensors, according to some embodiments.

FIG. 14 is a block diagram illustrating signal-processing techniques used to enhance measurements from one or more pressure sensors, according to some embodiments. The techniques can be applied to the signals and/or recorded data from sensors, such as the sensors 150 and/or 1250 shown in FIG. 9, to further enhance the evaluation of the elastomeric sealing elements of the BOP. As a part of the acquisition system (electronics), an algorithm shown in FIG. 14 uses adaptive Analog-to-Digital-Conversion (ADC) gain and adaptive steady-state input offset to "zoom" in on specific operating points rather than looking at relatively small changes over the full measurement range. Block 1710 represents the acquisition from the sensor (e.g., in volts) without any offset compensation with full scale gain. In block 1712, the measurement computation is made with the full-scale gain and calibration. In block 1714, if the acquisition voltage is greater or equal to the offset compensation step, then the offset compensation is increased (block 1716). Otherwise, in block 1718, if the acquisition voltage is less than or equal to half of the full scale, then in block 1720, the ADC gain is increased. When the acquisition voltage is greater than half of the full scale, then in block 1724, the measurement acquisition is recorded with calibration steps (if any). Using techniques such shown in FIG. 14, increased sensitivity in psi/V with increased resolution in psi/V can be achieved. According to some embodiments, sensitivity and/or resolution could be improved by a factor of 2 to 100.

According to some embodiments, novel techniques are described to monitor a condition and/or a service life of a packer element of an annular BOP. According to some embodiments, high-quality pressure sensors are positioned above and/or below the packer element of the annular BOP. Pressure variations measured below the packer element are monitored versus piston position and/or time. The measured pressure variations can be used to detect elastomer wear that can occur over time and/or after pressure cycles. Pressure variations measured above the elastomer seal can be used to detect possible elastomer leakage, and in some cases, estimate the leakage rate. Finally, the differential pressure between the two sensors (e.g., above and below the packer element) can also be monitored, which can be used for micro-leak geometry characterization. Additional novel techniques are envisioned and are discussed with reference to FIGS. 15-25.

Figure 15:
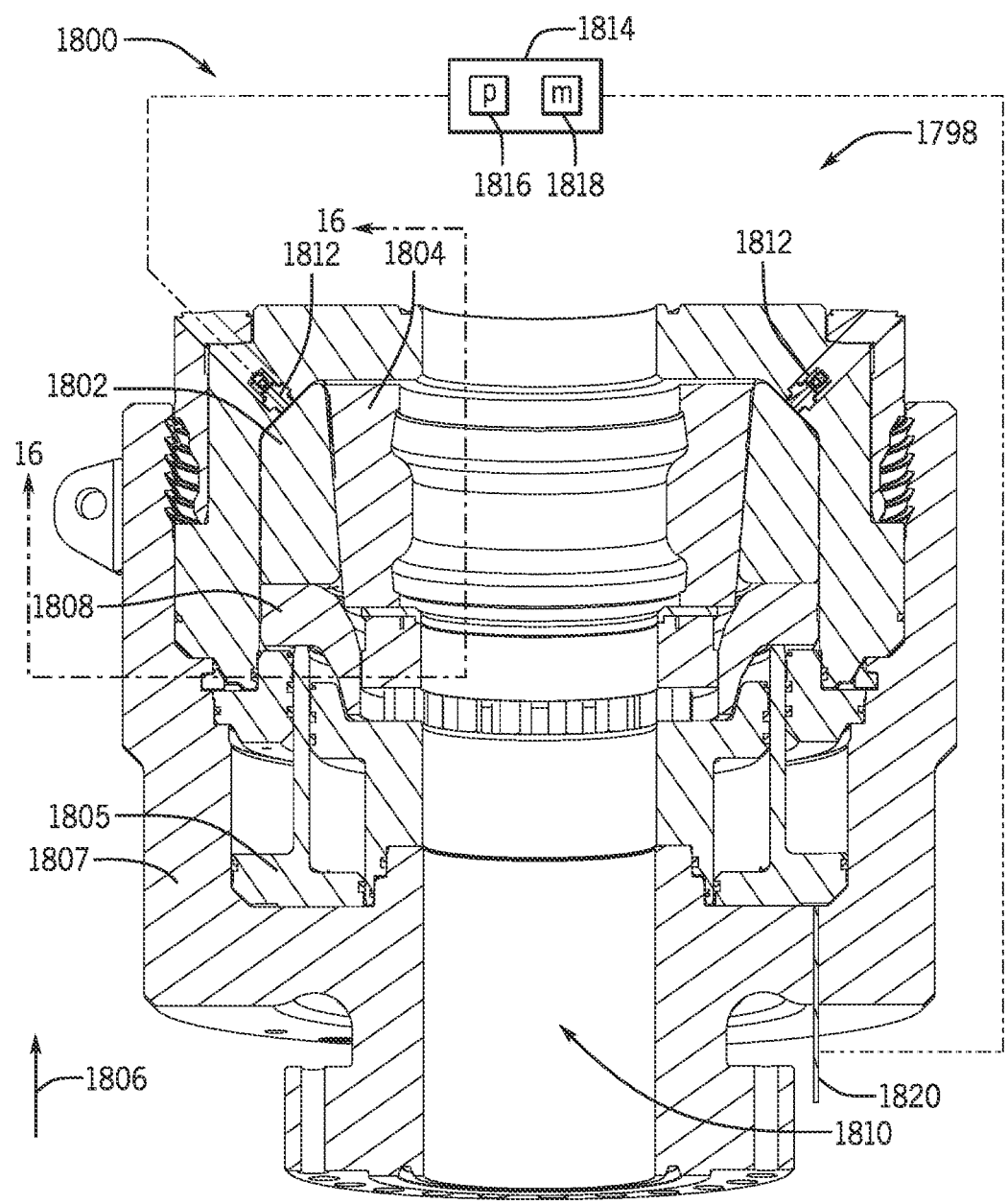
FIG. 15 is a cross-sectional view of an annular BOP with a detection system, according to some embodiments.

FIG. 15 is a cross-sectional view of an embodiment of an annular BOP 1798 that includes a detection system 1800 (e.g., monitoring system; tool diameter detection system; tool joint detection system; donut collapse detection system; packer volume loss detection system). In some embodiments, the detection system 1800 may carry out a tool diameter detection process by using a pressure or strain sensor and a piston stroke sensor to detect a diameter size of a tool (e.g., tubular) within the annular BOP 1798. In some embodiments, the detection system 1800 may carry out a tool joint detection process by using a pressure or strain sensor to monitor changes in pressure and/or strain with respect to time to detect a presence of a tool joint (e.g., radially-expanded joints that couple pipe sections of the tubular to one another) within the annular BOP 1798.

As shown, the annular BOP 1798 includes multiple annular elastomer components, which may be referred to herein as a donut 1802 and a packer 1804. The donut 1802 circumferentially surrounds the packer 1804, and the donut 1802 is positioned radially between the packer 1804 and a BOP housing 1807. While the annular BOP 1798 includes both the donut 1802 and the packer 1804, it should be appreciated that the detection system 1800 may be used with any of a variety of types of annular BOPs, including annular BOPs that are devoid of the donut 1802 (e.g., only include one annular elastomer component, such as a packer).

In order to actuate the donut 1802 and the packer 1804 to form a seal (e.g., annular seal about the tool), a piston 1805 (e.g., annular piston) is driven axially in an axial direction 1806 (the axial direction may also be referred to herein as an axial axis of the annular BOP 1798). For example, a hydraulic fluid may be pumped into the BOP housing 1807 into a space (e.g., annular space) below the piston 1805, which drives the piston 1805 upwards in the axial direction 1806. The piston 1805 drives and lifts a pusher plate 1808, which in turn contacts and compresses the donut 1802. The compression of the donut 1802 forces the packer 1804 radially inwards to form the seal about the tool within a BOP bore 1810 or to enable the packer 1804 to seal against itself across the BOP bore 1810 if no tool is present within the BOP bore 1810.

In order to detect a diameter size of the tool (e.g., changes in the diameter size) and/or to detect a tool joint in the annular BOP 1798, the detection system 1800 includes one or more pressure and/or strain sensors 1812 that output pressure and/or strain signals indicative of measured pressure and/or strain. In addition to the sensors 1812, the detection system 1800 may include one or more piston stroke sensors 1820 (e.g., 1, 2, 3, 4) to facilitate detection of the diameter size of the tool. The piston stroke sensor 1820 outputs position signals indicative of a measured position of the piston 1805, which enables the controller 1814 to determine how far the piston 1805 moves in the axial direction 1806 during actuation of the annular BOP 1798 (e.g., a piston stroke length). The sensors 1812 and the piston stroke sensor 1820 may couple to a controller 1814 (e.g., electronic controller) that includes a processor 1816 and a memory device 1818. It should be appreciated that the controller 1814 may include operational features that are similar to or the same as the data processing unit 250 disclosed herein.

In operation, the controller 1814 receives the signals from the sensors 1812 and/or the piston stroke sensor 1820, and the controller 1814 processes the signals with the processor 1816. The processor 1816 may be used to execute software, such as software that enables the detection system 1800 to detect the diameter size of the tool in the annular BOP 1798 using feedback from the sensors 1812 and the piston stroke sensor 1820. As will be explained in more detail below, the controller 1814 determines the pressure and/or strain on the donut 1802 and the piston stroke length of the piston 1805. By determining how far the piston 1805 moved to achieve a desired pressure and/or strain, the controller 1814 is able to determine the diameter size of the tool in the annular BOP 1798. The processor 1816 may also execute software that enables the detection system 1800 to detect tool joints as they pass through the annular BOP 1798 using feedback from the sensors 1812 with respect to time.

The processor 1816 may include multiple microprocessors, one or more "general-purpose" microprocessors, one or more special-purpose microprocessors, and/or one or more application specific integrated circuits (ASICS), or some combination thereof. For example, the processor 1816 may include one or more reduced instruction set computer (RISC) processors. The memory device 1818 may include a volatile memory, such as random access memory (RAM), and/or a nonvolatile memory, such as read-only memory (ROM). The memory device 1818 may store a variety of information and may be used for various purposes. For example, the memory device 1818 may store processor executable instructions (e.g., firmware or software) for the processor 1816 to execute, such as instructions for processing the signals from the sensors 1812 and/or the piston stroke sensor 1820. The storage device(s) (e.g., nonvolatile memory) may include ROM, flash memory, a hard drive, or any other suitable optical, magnetic, or solid-state storage medium, or a combination thereof. The storage device(s) may store data, instructions, and any other suitable data. It should be appreciated that the controller 1814 may include other components, such as communication components that enable wired and/or wireless transmission of data to other devices and/or systems.

As shown in FIG. 15, a first sensor 1812 of the one or more sensors 1812 is positioned on a first side of the annular BOP 1798, and a second sensor 1812 of the one or more sensors 1812 is positioned on a second side of the annular BOP 1798 that is opposite the first side of the annular BOP 1798 (e.g., offset by approximately 180 degrees about a circumference of the annular BOP 1798). The first sensor 1812 and the second sensor 1812 are supported within the BOP housing 1807 to contact the donut 1802 (e.g., an upper, tapered surface of the donut 1802). Additional features of the one or more sensors 1812 may be understood with reference to FIG. 16.

Figure 16:
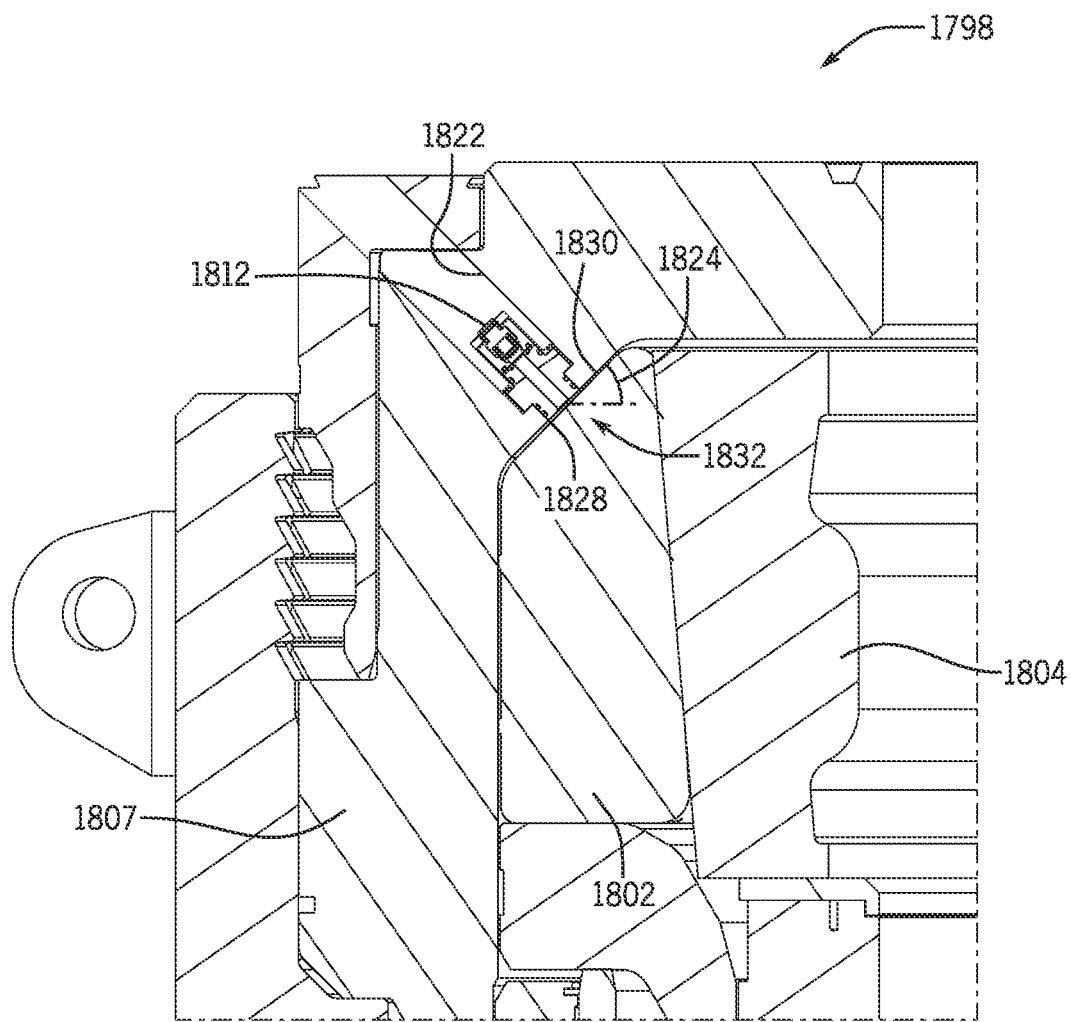
FIG. 16 is a cross-sectional view of a portion of an annular BOP, such as the annular BOP of FIG. 15 taken within line 16-16, according to some embodiments.

In particular, FIG. 16 is a cross-sectional view of a portion of an embodiment of an annular BOP, such as the annular BOP 1798 of FIG. 15 taken within line 16-16. While FIG. 16 includes one sensor 1812 of the one or more sensors 1812 to facilitate discussion, it should be appreciated that some or all of the one or more sensors 1812 may have the same features. As shown, the sensor 1812 is supported by the BOP housing 1807, such as by being positioned within an opening 1822 that is formed in and extends through the BOP housing 1807. The sensor 1812 may be oriented at an angle 1824 relative to a radial axis 1826 of the annular BOP 1798 (the radial axis 1826 may also be referred to herein as a radial direction). More particularly, an inner end 1828 of the sensor 1812 may be configured to contact an upper, tapered surface 1830 of the donut 1802 at an interface 1832, which may be oriented at the angle 1824 relative to the radial axis 1826. The angle 1824 may be between about 15 to 85 degrees, 30 to 60 degrees, or 40 to 50 degrees. In some embodiments, the angle 1824 may be approximately 15, 25, 35, 45, 55, or 65 degrees.

The configuration shown in FIGS. 15 and 16 (e.g., the sensor 1812 oriented at the angle 1824) may enable the sensor 1812 to accurately measure the pressure and/or strain, as the sensor 1812 may detect the pressure and/or strain due to a reaction force at the tool within the annular BOP 1798 and/or with less error due to a reaction force at the piston 1805 and/or with less error due to frictional forces. The configuration may also provide access to the sensor 1812 from outside the annular BOP 1798, such as access to the sensor 1812 without dismantling the annular BOP 1798 for more efficient maintenance operations (e.g., inspection and/or repair operations). The access to the sensor 1812 may also facilitate communication with the sensor 1812, such as wired and/or wireless communications with the sensor 1812 (e.g., for power, control, and/or data transfer).

Figure 17:
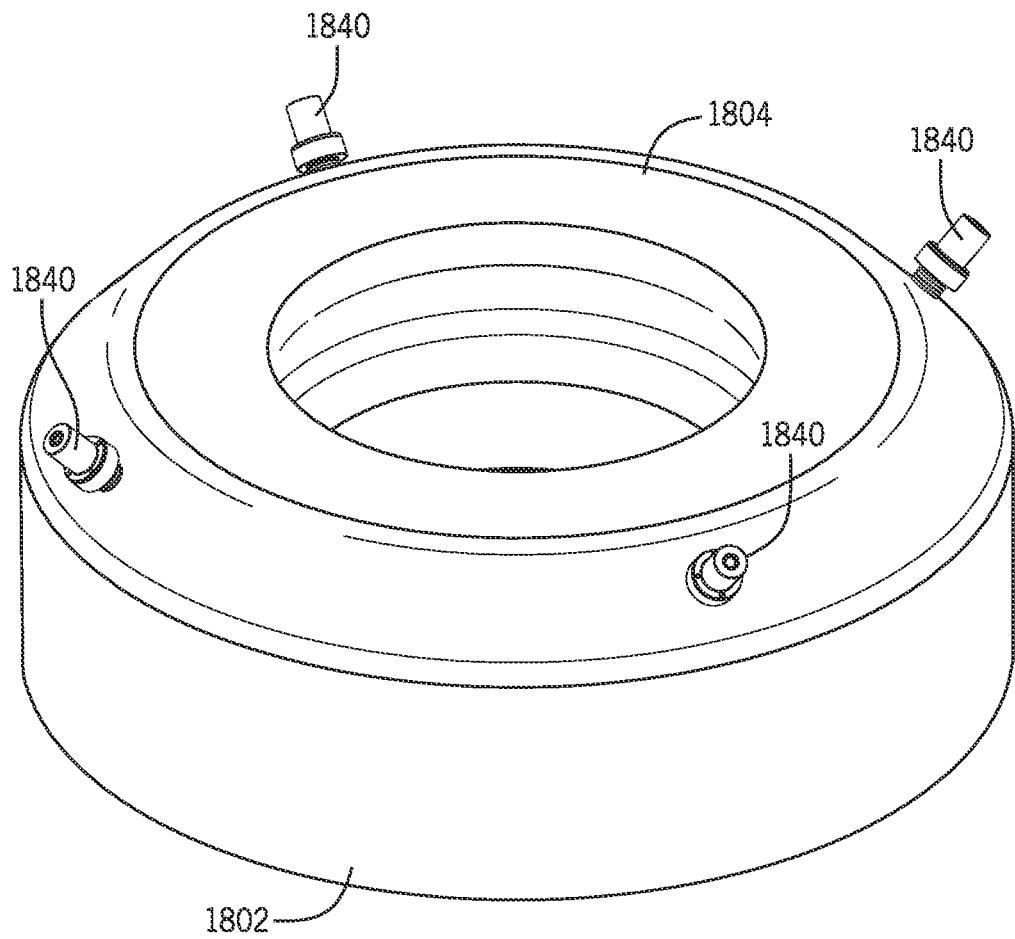
FIG. 17 is a perspective view of a packer donut and a packer that may be used in an annular BOP, such as the annular BOP of FIG. 15, according to some embodiments.

FIG. 17 is a perspective view of an embodiment of the donut 1802 surrounding the packer 1804. FIG. 17 also illustrates locations where the sensors 1812 may contact the donut 1802 to measure the pressure and/or strain. As illustrated, there are four locations 1840 equally spaced about a circumference of the donut 1802 where the sensors 1812 are configured to contact the donut 1802. While the four locations 1840 are illustrated in FIG. 17, it should be appreciated that there may be a different number of locations 1840 depending on the number of sensors 1812 (e.g., 1, 2, 3, 4, 5, 6, 7, 8, or more locations 1840 and sensors 1812). The locations 1840 may be equidistant or vary in distance from each other. However, equally spaced sensors 1812 may facilitate accurate assessment of the diameter size of the tool and/or tool joint detection.

Figure 18:
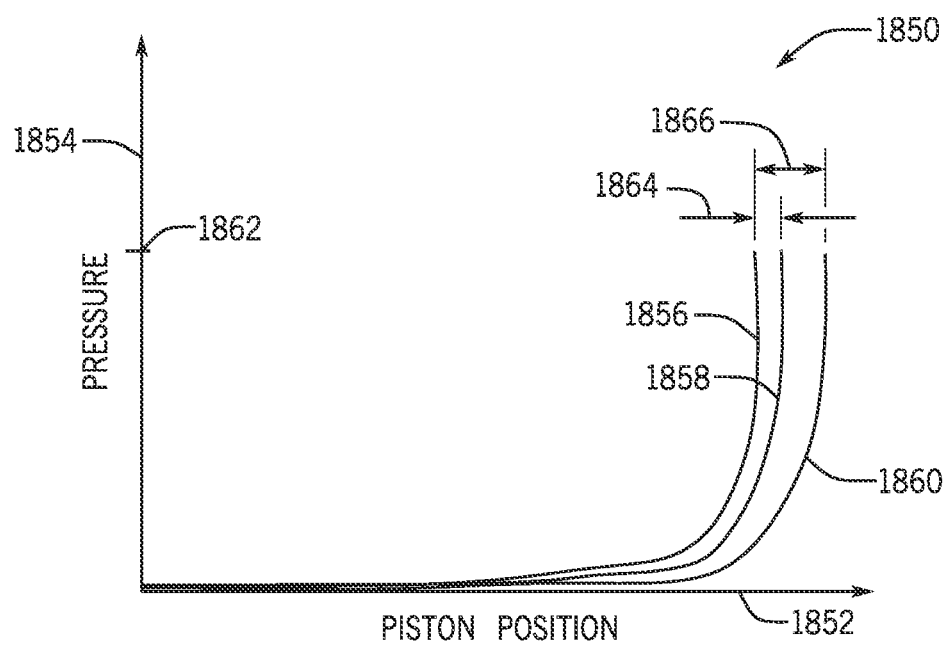
FIG. 18 is a plot illustrating contact pressure with respect to piston stroke distance, according to some embodiments.

FIG. 18 is a plot 1850 illustrating an example of a response of the donut 1802 with respect to a position of the piston 1805 (e.g., piston stroke length). The plot 1850 includes a first axis 1852 (e.g., x-axis) that represents a piston position (e.g., piston stroke length) and a second axis 1854 (e.g., y-axis) that represents pressure or strain. The response of the donut 1802 is illustrated with curves 1856, 1858, and 1860. More particularly, the curves 1856, 1858, and 1860 represent the response of the donut 1802 with tools of different diameter sizes in the annular BOP 1798.

As illustrated, in order to reach a desired pressure or strain level 1862 (e.g., that provides the seal about the tool; a target value, which may be stored in the memory device 1818, entered by an operator, and/or calculated by the controller 1814 or other computing system), the piston position may differ depending on the diameter size of the tool. For example, the piston 1805 may have to move an additional distance 1864 during a second closure of the annular BOP 1798 as compared to during a first closure of the annular BOP 1798 because a respective diameter size of a second tool (or tool section) in the annular BOP 1798 during the second closure is less than a respective diameter size of a first tool (or tool section) in the annular BOP 1798 during the first closure. In other words, the piston 1805 has to move a greater distance in order to provide the same contact pressure or strain (e.g., the pressure or strain level 1862).

Similarly, the piston 1805 may have to move an additional distance 1866 during a third closure of the annular BOP 1798 as compared to during the first closure of the annular BOP 1798 because a respective diameter size of a third tool (or tool section) in the annular BOP 1798 during the third closure is less than the respective diameter size of the first tool (or tool section) during the first closure and is less than the respective diameter size of the second tool (or tool section) during the second closure. In operation, the detection system 1800, and particularly the controller 1814 of the detection system 1800, is configured to correlate the piston position that achieves the desired pressure or strain level 1862 to the diameter size of the tool within the annular BOP 1798. It should be appreciated that the controller 1814 may utilize one or more algorithms, look up tables, or the like to determine the diameter size of the tool within the annular BOP 1798 based on the piston position that achieves the desired pressure or strain level 1862.

An indication of the diameter size of the tool within the annular BOP 1798 may be output to the operator (e.g., via a display that is communicatively coupled to the controller 1814). In some embodiments, the diameter size of the tool may be used to assist in tracking and/or locating portions of the tool, such as tracking and/or locating which portions of the tool are in the wellbore, which portions of the tool are in the BOP stack assembly, which portions of the tool are above the BOP stack, and the like. In some cases, a sequence of pipes joined by tool joints to form a tubular may be stored in a data log (e.g., in the memory device 1818). Characteristics (e.g., diameters) of the pipes and the tool joints may also be stored in the data log.

As one example to facilitate discussion, the data log may indicate that a series of small diameter pipes is positioned below a series of large diameter pipes. The diameter size of the tool as detected by the detection system 1800 may indicate whether one of the series of the small diameter pipes is positioned in the annular BOP 1798 (e.g., such as due to the piston position itself and/or due to a sudden change in the piston position due to the series of larger diameter pipes moving out of the annular BOP 1798 as the tool is pulled out of the wellbore during stripping operations). An indication that one of the series of small diameter pipes is positioned in the annular BOP 1798 may then be output to the operator and/or the information may be used to control other operations. For example, based on the information derived from the data log and/or the location of the one of the series of small diameter pipes in the annular BOP 1798, the controller 1814 may instruct certain operations, enable certain operations (e.g., enable operation of a pipe ram BOP with pipe rams that are sized to seal about the series of small pipes), and/or block certain operations (e.g., block operation of a pipe ram BOP with pipe rams that are not sized to seal about the series of small diameter pipes). It should be appreciated that any of a variety of tools having any of a variety of configurations may extend through the annular BOP 1798, and the operations (e.g., related to a pipe ram BOP or other equipment) carried out in response to the detection of the diameter size of the tool may vary accordingly.

Figure 19:
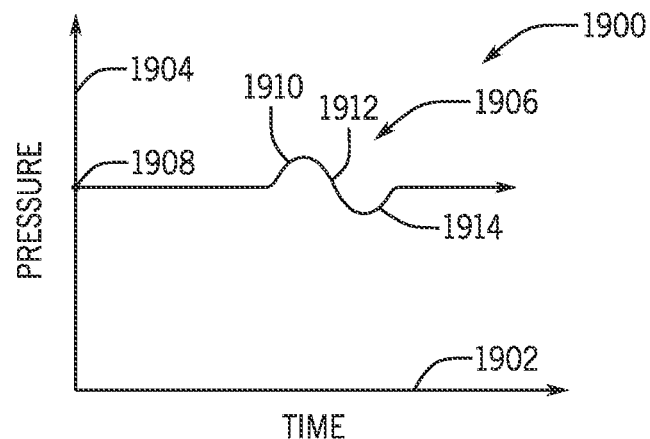
FIG. 19 is a plot illustrating contact pressure with respect to time, according to some embodiments.

FIG. 19 is a plot 1900 illustrating a contact pressure with respect to time for the donut 1802 of the annular BOP 1798. The plot 1900 illustrates a response of the donut 1802 to a passage of a tool joint through the annular BOP 1798 while the annular BOP 1798 is closed (e.g., while the packer 1804 is sealed about the tool; during stripping operations). As noted herein, the tool joints connect pieces of equipment, such as tubulars (e.g., pipes), together to form the tool. The tool joint may define a diameter that differs from (e.g., is larger than) a remainder of the equipment. As the tool joint passes through the annular BOP 1798 while the annular BOP 1798 is closed, the tool joint may force radial expansion of the packer 1804, and thus, compression of the donut 1802 radially outward toward the BOP housing 1807. This additional compression of the donut 1802 is detectable with the pressure and/or strain sensors 1812. For example, as the tool moves through the annular BOP 1798 while the annular BOP 1798 is closed, the additional compression of the donut 1802 is a temporary event that causes the pressure and/or strain signal to change in a particular manner over time (e.g., to correspond to a signature, which may be known and stored in the memory device 1818).

The plot 1900 includes a first axis 1902 (e.g., x-axis) that represents time and a second axis 1904 (e.g., y-axis) that represents the pressure or strain. The response of the donut 1802 over time is illustrated with the curve or line 1906. As illustrated, the curve or line 1906 starts with the annular BOP 1798 already closed and the donut 1802 loaded to the desired pressure or strain level 1908. During drilling operations, the tool may be pulled through the annular BOP 1798 while the annular BOP 1798 is closed. This may be referred to as stripping or scrapping the tool. As the tool is pulled through the annular BOP 1798 while the annular BOP 1798 is closed, the tool joints that hold sections of the tool together are also pulled through the annular BOP 1798. As explained above, the tool joint may define a diameter that is greater than a respective diameter of other sections of the tool (e.g., other sections joined by the tool joint). Accordingly, as the tool joint passes through the annular BOP 1798 while the annular BOP 1798 is closed, the tool joint may contact the packer 1804, which may force or drive the packer 1804 radially outward. As the packer 1804 expands radially outward, the packer 1804 in turn causes compression of the donut 1802. This compression of the donut 1802 is detected by the pressure or strain sensors 1812, and this is reflected in portion 1910 (e.g., increasing; positive slope) of the curve or line 1906.

Then, after the tool joint passes through the packer 1804, the donut 1802 expands as the excess pressure is removed, which is detected by the pressure or strain sensors 1812 as a reduction in the contact pressure. This reduction in the contact pressure is reflected in portion 1912 (e.g., decreasing; negative slope) of the curve or line 1906. The pressure or strain on the donut 1802 then again increases (e.g., equalizes; returns to a steady state and/or to an initial pressure or strain, which may be the desired pressure or strain 1908) as another section of the tool (e.g., other than the tool joint) enters the annular BOP 1798 (e.g., is positioned within the packer 1804). When the annular BOP 1798 is in proper working condition, and when the sections of the tool before and after the tool joint have matching diameters sizes, the pressure or strain on the donut 1802 may increase to return to the initial pressure or strain, which may be the desired pressure or strain 1908, as reflected in the portion 1914 (e.g., increasing; positive slope) of the curve or the line 1906.

It is by monitoring these changes in the pressure or strain on the donut 1802 overtime that the detection system 1800 is able to detect the passage of the tool joints through the annular BOP 1798. For example, the controller 1814 may count a number of tool joints over time (e.g., based on a number of such signatures recognized by the controller 1814 over time). In some embodiments, the controller 1814 may output an indication of the number of tool joints that have passed through the annular BOP 1798 (e.g., display a counter in substantially real time, where the counter displays a numerical value that increases by one with each tool joint detected via the disclosed techniques) and/or provide an indication each time a tool joint passes through the annular BOP 1798 (e.g., an audible or visual indicator).

Furthermore, as noted herein, the data log may include a sequence of pipes joined by the tool joints. The data log may also include the characteristics of the pipes and the tool joints, such as a spacing or a distance separating the tool joints. Thus, the controller 1814 may determine a total length of a portion of the tool pulled through the annular BOP 1798 (e.g., based on the number of tool joints pulled through the annular BOP 1798 and a distance between the tool joints), a rate at which the tool is pulled through the annular BOP 1798 (e.g., based on a time between adjacent tool joints and a distance between the adjacent tool joints), and the like. The controller 1814 may output the information to the operator to facilitate understanding and tracking of the operations.

The controller 1814 may also use the information related to the tool joints to control other operations. For example, based on information derived from the data log and/or the detection of the tool joint in the annular BOP 1798, the controller 1814 may instruct certain operations, enable certain operations, and/or block certain operations. As a more specific example, the controller 1814 may access a spacing that separates the tool joints, calculate a rate of movement of the tool through the annular BOP 1798, and/or detect a first tool joint in the annular BOP 1798. In some such cases, upon detection of the first tool joint in the annular BOP 1798, the controller 1814 may determine when a nonshearable section of the tool (or when a shearable section of the tool) will be within a shear ram BOP. For example, the controller 1814 may determine that a second tool joint (e.g., below the first tool joint) will be present within the shear ram BOP at a particular time (e.g., time window). Then, the controller 1814 may output an indication to the operator to notify the operator that certain ram BOPs (e.g., closure of the shear ram BOP) should not be operated during the particular time. It should be appreciated that the controller 1814 may additionally or alternatively output an indication to notify the operator that the certain ram BOPs (e.g., closure of the shear ram BOP) may be effectively completed during other times, such as other times that are not at the particular time (e.g., a shearable section of the tool is within the shear ram BOP).

The controller 1814 may also automate certain operations, such as to delay and/or to block operation of the shear ram BOP while the second tool joint is at the shear ram BOP. It should be appreciated that any of a variety of tools having any of a variety of configurations may extend through the annular BOP 1798, and the operations in response to the detection of the tool joint may vary accordingly. Furthermore, while control of the ram BOPs is described herein to facilitate discussion, it should be appreciated that the detection of the tool joint in the annular BOP 1798 may be utilized to control any of a variety of operations (e.g., rotating control devices, valves).

Figure 20:
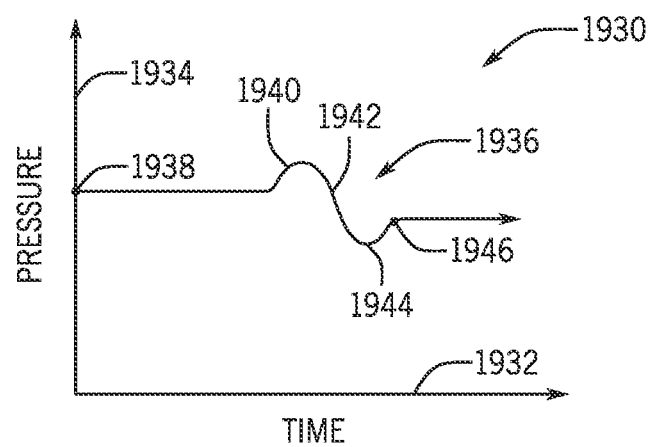
FIG. 20 is a plot illustrating contact pressure with respect to time, according to some embodiments.

FIG. 20 is a plot 1930 illustrating a contact pressure with respect to time for the donut 1802 of the annular BOP 1798. The plot 1930 illustrates the response of the annular BOP 1798 to a passage of a tool joint through the annular BOP 1798 while the annular BOP 1798 is closed. As explained above, the tool joint may define a diameter that differs from (e.g., is larger than) the diameters of a remainder of the tool. As the tool joint passes through the annular BOP 1798 while the annular BOP 1798 is closed, the tool joint may force expansion of the packer 1804, and thus, compression of the donut 1802. This additional compression of the donut 1802 is detectable with the pressure or strain sensors 1812.

The plot 1930 includes a first axis 1932 (e.g., x-axis) that represents time and a second axis 1934 (e.g., y-axis) that represents pressure or strain. The response of the donut 1802 over time is illustrated with the curve or line 1936. As illustrated, the curve or line 1936 starts with the annular BOP 1798 already closed and the donut 1802 loaded to a desired pressure or strain level 1938. During drilling operations, the tool may be pulled through the annular BOP 1798 while the annular BOP 1798 is closed. As the tool is pulled through the annular BOP 1798 while the annular BOP 1798 is closed, the tool joints that hold sections of the tool together are also pulled through the annular BOP 1798 while the annular BOP 1798 is closed.

Accordingly, as the tool joint passes through the annular BOP 1798 while the annular BOP 1798 is closed, contact between the tool joint and the packer 1804 may force or drive the packer 1804 radially outward. As the packer 1804 expands radially outward, the packer 1804 in turn causes compression of the donut 1802. This compression of the donut 1802 is detected by the pressure or strain sensors 1812, and this is reflected in portion 1940 (e.g., increasing; positive slop) of the curve or line 1936. After the tool joint passes through the packer 1804, the donut 1802 expands as the excess pressure is removed, which is detected by the pressure or strain sensors 1812 as a reduction in contact pressure. This reduction in pressure is reflected in portion 1942 (e.g., decreasing; negative slope) of the curve or line 1936. The pressure or strain on the donut 1802 then increases as the diameter of the tool within the annular BOP 1798 returns to a steady state, which is reflected in portion 1944 (e.g., increasing; positive slope) of the curve or line 1936.

However, in some situations, the pressure or strain on the donut 1802 may not return to the initial pressure or strain (e.g., the desired pressure or strain 1938); but instead, equalizes at a different pressure or strain seen at point 1946. As illustrated, the pressure or strain on the donut 1802 may equalize at a lower pressure or strain. The reduction in the pressure or strain on the donut 1802 indicates that a next section of the tool (e.g., after the tool joint) may have a smaller diameter than the previous section of the tool (e.g., before the tool joint). By monitoring for the tool joint and a transition to a smaller diameter section of the tool, the detection system 1800 may determine information about the tool that may be provided to the operator and/or used to control other operations, including any of the other operations disclosed herein. Furthermore, in some embodiments, the controller 1814 may increase the hydraulic fluid pressure on the piston 1805 to drive the piston 1805 in the axial direction 1806 until the pressure or strain sensors 1812 output signals that indicate that the desired pressure or strain 1938 is reached (e.g., automated feedback loop).

Figure 21:
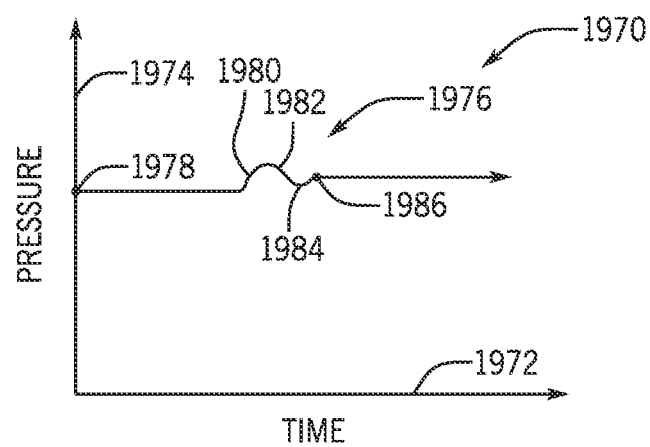
FIG. 21 is a plot illustrating contact pressure with respect to time, according to some embodiments.

FIG. 21 is a plot 1970 illustrating a contact pressure with respect to time for the donut 1802 of the annular BOP 1798. The plot 1970 illustrates a response of the annular BOP 1798 to a passage of a tool joint through the annular BOP 1798 after closure. As explained above, as the tool joint pass through the annular BOP 1798, the tool joint may force expansion of the packer 1804, and thus, compression of the donut 1802. This additional compression of the donut 1802 is detectable with the pressure or strain sensors 1812.

The plot 1970 includes a first axis 1972 (e.g., x-axis) that represents time and a second axis 1974 (e.g., y-axis) that represents pressure. The response of the donut 1802 over time is illustrated with the curve or line 1976. As illustrated, the curve or line 1976 starts with the annular BOP 1798 already closed and the donut 1802 loaded to a desired pressure level 1978. During drilling operations, the tool may be pulled through the annular BOP 1798 while the annular BOP 1798 is closed. As the tool is pulled through the annular BOP 1798 while the annular BOP 1798 is closed, the tool joints that hold sections of the tool together are also pulled through the annular BOP 1798 while the annular BOP 1798 is closed. As the tool joint passes through the annular BOP 1798 while the annular BOP 1798 is closed, the tool joint may contact the packer 1804 and may force or drive the packer 1804 radially outward. The expansion of the packer 1804 radially outward causes compression of the donut 1802. This compression of the donut 1802 is detected by the pressure or strain sensors 1812 and is reflected as portion 1980 (e.g., increasing; positive slope) in the curve or line 1976.

After the tool joint passes through the packer 1804, the donut 1802 expands as the excess pressure is removed, which is detected by the pressure or strain sensors 1812 as a reduction in contact pressure. This reduction in pressure is reflected in portion 1982 (e.g., decreasing; negative slope) of the curve or line 1976. The pressure or strain on the donut 1802 then increases as the diameter of the tool within the annular BOP 1798 returns to a steady state, which is reflected in portion 1984 (e.g., increasing; positive slope) of the curve or line 1976.

However, in some situations, the pressure or strain on the donut 1802 may not return to the initial pressure or strain (e.g., the desired pressure or strain 1978); but instead, equalizes at a different pressure or strain seen at point 1986. As illustrated, the pressure or strain on the donut 1802 may equalize at a higher pressure or strain. The increase in pressure or strain on the donut 1802 indicates that a next section of the tool (e.g., after the tool joint) has a larger diameter than a previous section of the tool (e.g., before the tool joint). By monitoring for the tool joint and a transition to a larger diameter section of the tool, the detection system 1800 may determine information about the tool that may be provided to the operator and/or used to control other operations, including any of the other operations disclosed herein. Furthermore, in some embodiments, the controller 1814 may decrease the hydraulic fluid pressure on the piston 1805 to drive the piston 1805 opposite the axial direction 1806 until the pressure or strain sensors 1812 output signals that indicate that the desired pressure or strain 1978 is reached (e.g., automated feedback loop).

The sensors 1812 and the piston stroke sensor 1820 may also be utilized to assess the condition of the packer elements (e.g., the donut 1802 and/or the packer 1804) of the annular BOP 1798 in other ways. For example, the pressure and/or strain and the piston position may be used to identify wear on the packer 1804 and/or collapse of the donut 1802. Thus, the detection system 1800 may carry out a packer wear detection process and/or a donut collapse detection process, as discussed in more detail below.

Figure 22:
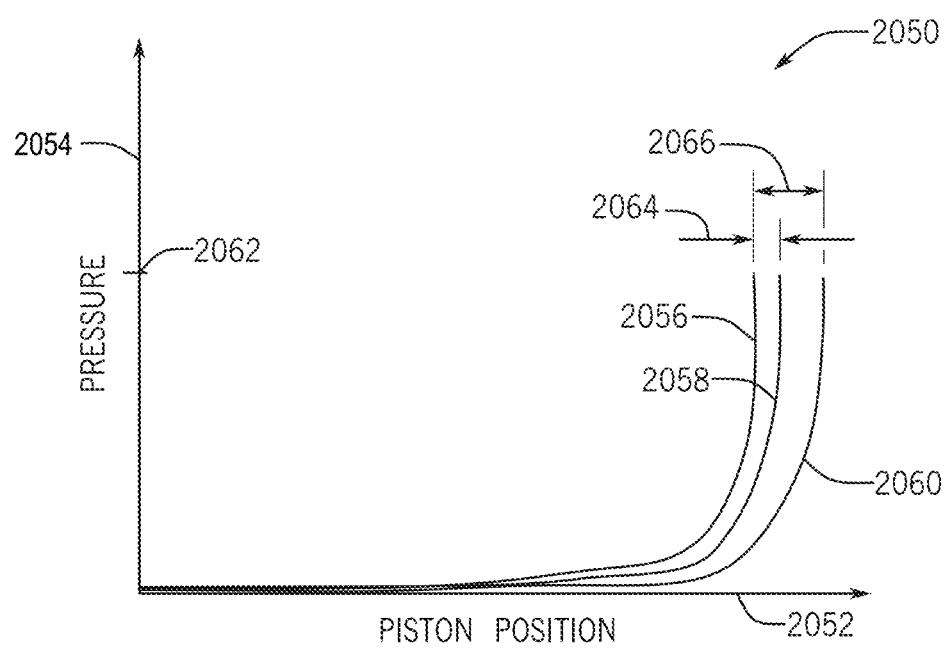
FIG. 22 is a plot illustrating contact pressure with respect to piston stroke distance, according to some embodiments.

FIG. 22 is a plot 2050 illustrating a response of the donut 1802 with respect to a position of the piston 1805 (e.g., piston stroke length). The plot includes a first axis 2052 (e.g., x-axis) that represents the piston position (e.g., piston stroke length) and a second axis 2054 (e.g., y-axis) that represents pressure. The response of the donut 1802 is illustrated with curves 2056, 2058, and 2060. The curves 2056, 2058, and 2060 represent actuation of the donut 1802 at different times, with the curve 2056 being at a first time, followed sequentially by the curve 2058 at a second time and then by the curve 2060 at a third time. In some embodiments, the curve 2056 may be considered a baseline or initial curve that establishes an expected behavior to seal about a tool with a particular diameter size without volume loss from the donut 1802 and/or the packer 1804.

As illustrated, with each closure of the annular BOP 1798, the piston 1805 moves a greater distance to reach a desired pressure or strain level 2062 on the donut 1802. For example, the piston 1805 may have to move an additional distance 2064 at the second closure as compared to the first closure, an additional distance 2066 at the third closure as compared to the first closure. These changes represent a loss of material of the donut 1802 and/or the packer 1804, which in turn represents overall volume loss from the donut 1802 and/or the packer 1804.

In operation, the controller 1814 may detect these changes in the piston stroke distance and correlate them to the volume loss. It should be appreciated that the controller 1814 may utilize one or more algorithms, look up tables, or the like to determine the volume loss based on the piston position that achieves the desired pressure or strain level 2062. The controller 1814 may be configured to provide an output to an operator to notify the operator of the detection of the volume loss and/or to provide an indication of the volume loss (e.g., a quantity or a percentage volume loss; a severity level). In some embodiments, the controller 1814 may be configured to provide a recommendation of a time to conduct maintenance operations (e.g., inspect, repair, or replace components) on the annular BOP 1798. For example, in response to the piston position and/or the volume loss exceeding a threshold (e.g., the piston position and/or the volume loss varies by more than 5 percent compared to a most recent closure or a baseline closure), the controller 1814 may identify excessive volume loss and output the recommendation to replace the donut 1802 and/or the packer 1804. With reference to FIG. 22, the additional distance 2064 may not exceed the threshold and may not result in the recommendation to replace the donut 1802 and/or the packer 1804, while the additional distance 2066 may exceed the threshold and may result in the recommendation to replace the donut 1802 and/or the packer 1804.

Furthermore, the controller 1814 may analyze trends over time (e.g., closures over time) and provide an output that indicates a prediction of a future time at which it is recommended to replace the donut 1802 and/or the packer 1804. For example, even if the threshold is not exceeded, consistently increasing piston positions over a series of closures (e.g., increasing piston position for each closure in five consecutive closures) may enable the controller 1814 to estimate when the threshold will be exceeded and/or may result in the controller 1814 providing an indication to the operator (e.g., to notify the operator that the recommendation to replace may be provided after the next closure).

In some embodiments, the controller 1814 may access the data log, including the characteristics related to the diameter of the tool within the annular BOP 1798, prior to providing the recommendation (e.g., to determine that the diameter has not changed and/or is unlikely to be a cause of the change in the piston position). Furthermore, the controller 1814 may assess a rate of the change and/or a pattern in the change to distinguish the change due to the diameter size of the tool from the change due to the volume loss (e.g., the change due to the diameter size of the tool may be relatively sudden and/or correlate with the data log that shows characteristics of the tool, while the change due to the volume loss may be gradual over time and/or not correlate with the data log).

In some embodiments, the controller 1814 may carry out a calibration step to account for a change in the diameter size of the tool and/or to identify the volume loss even as the diameter size of the tool within the annular BOP 1798 varies over time. For example, the controller 1814 may identify the diameter size of the section of the tool within the annular BOP 1798 (e.g., using the data log and/or other information, such as based on the detection and/or the counting of the tool joints), and then, the controller 1814 may compare the piston stroke length to reach the desired pressure or strain to an expected piston stroke length to reach the desired pressure or strain to assess the volume loss. With reference to FIG. 22, if the curve 2058 is the baseline curve that was obtained with a first pipe section of the particular diameter size, and the curve 2060 is obtained with the first pipe section or a second pipe section of the particular diameter size, then the controller 1814 may determine that there is a volume loss and/or assess the volume loss.

Figure 23:
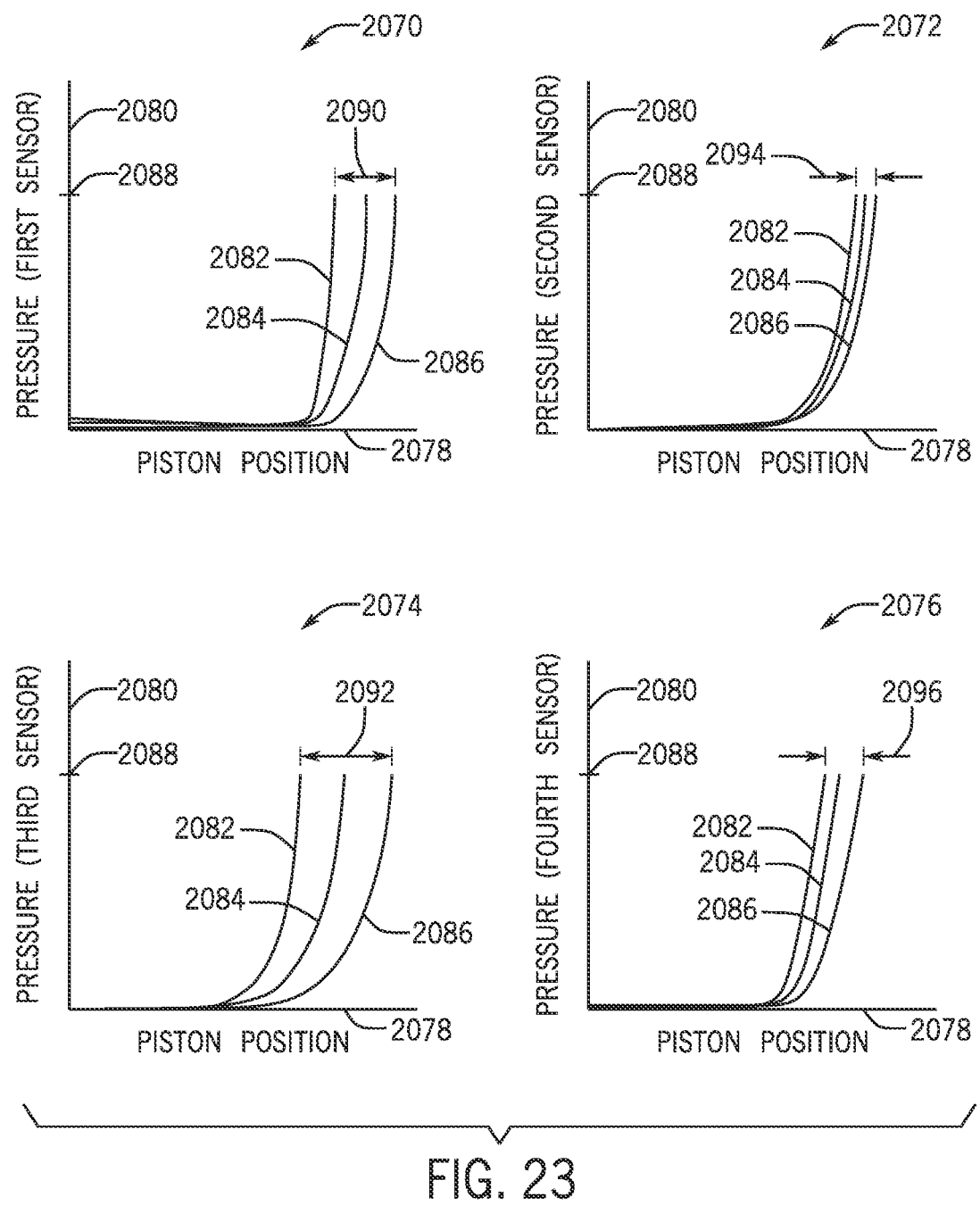
FIG. 23 is multiple plots illustrating contact pressure with respect to piston stroke distance, according to some embodiments.

FIG. 23 includes plots 2070, 2072, 2074, and 2076 that illustrate a response of the donut 1802 at different locations about the annular BOP 1798. As explained above, the detection system 1800 may include multiple sensors 1812 that detect the pressure or strain of the donut 1802 at different locations 1840. FIG. 23 illustrates an example of feedback that may be provided from four different sensors 1812. Accordingly, the plot 2070 represents the response of the donut 1802 at a first location as detected by a first sensor 1812, the plot 2072 represents the response of the donut 1802 at a second location as detected by a second sensor 1812, the plot 2074 represents the response of the donut 1802 at a third location as detected by a third sensor 1812, and the plot 2076 represents the response of the donut 1802 at a fourth location as detected by a fourth sensor 1812. Each plot includes an x-axis 2078 that represents the piston position (e.g., piston stroke length) and a y-axis 2080 that represents pressure or strain. Each plot includes curves 2082, 2084, and 2086 that represent actuation of the donut 1802. The curves 2082, 2084, 2086 may be at different times, with the curve 2082 being at a first time, followed sequentially by the curve 2084 being at a second time, and then by the curve 2086 being at a third time.

To facilitate understanding, the change in the piston position that would be needed to achieve the desired pressure or strain level 2088 at each location about the circumference is shown in each plot; however, it should be appreciated that in operation, the piston position would remain generally the same at each location about the circumference (e.g., the piston 1805 is annular and moves as one piece within the BOP housing 1807), and instead, the pressure may vary at the locations about the circumference for the piston positions at the different times due to the volume loss of the donut 1802 and/or the packer 1804.

As explained herein, each time the annular BOP 1798 closes, the piston 1805 may need to move a greater distance to reach the desired pressure or strain level 2088 on the donut 1802 due to the volume loss of the donut 1802 and/or packer 1804. However, the donut 1802 and/or packer 1804 may not experience uniform volume loss about the circumference. For example, different sections may experience different levels of volume loss. The difference in volume loss at different sections is illustrated in the plots 2070, 2072, 2074, and 2076. As illustrated, the distances 2090 and 2092 between the curves 2082, 2084, and 2086 in the plots 2070 and 2074 are greater than the distances 2094 and 2096 between the curves 2082, 2084, and 2086 in the plots 2072 and 2076. The differences in these distances indicate more volume loss of the donut 1802 and/or packer 1804 on one side of the annular BOP 1798 (e.g., at the first sensor and the third sensor). For example, half of the donut 1802 and/or the packer 1804 may experience more volume loss than the other half. It should be appreciated that, instead, the difference in volume loss at the different sections may be indicated by the pressure varying at the locations about the circumference for the piston positions at the different times.

As explained herein, the resolution of the detection system 1800 may increase with additional sensors 1812. In other words, additional sensors 1812 enable the detection system 1800 to detect which portions of the donut 1802 and/or the packer 1804 experience volume loss and/or a degree of the volume loss. This may enable the controller 1814 to detect the wear even if only present at a portion of the donut 1802 and/or the packer 1804. This may enable the controller 1814 to provide an output indicative of the volume loss and/or the locations of the volume loss (e.g., a heat map that represents the volume loss) and/or to provide a recommendation to conduct maintenance operations on the annular BOP 1798, among other actions disclosed herein. The controller 1814 may also control other operations, such as to stop stripping operations, to close a ram BOP, or the like, based on the volume loss and/or uneven volume loss.

It should be appreciated that the volume loss may be severe enough to cause collapse of the donut 1802 and/or other factors may occur to cause the collapse of the donut 1802. The collapse of the donut 1802 may result in the donut 1802 buckling, usually on one side of the donut 1802. The detection system 1800 may be configured to identify the collapse of the donut 1802, as discussed in more detail below.

Figure 24:
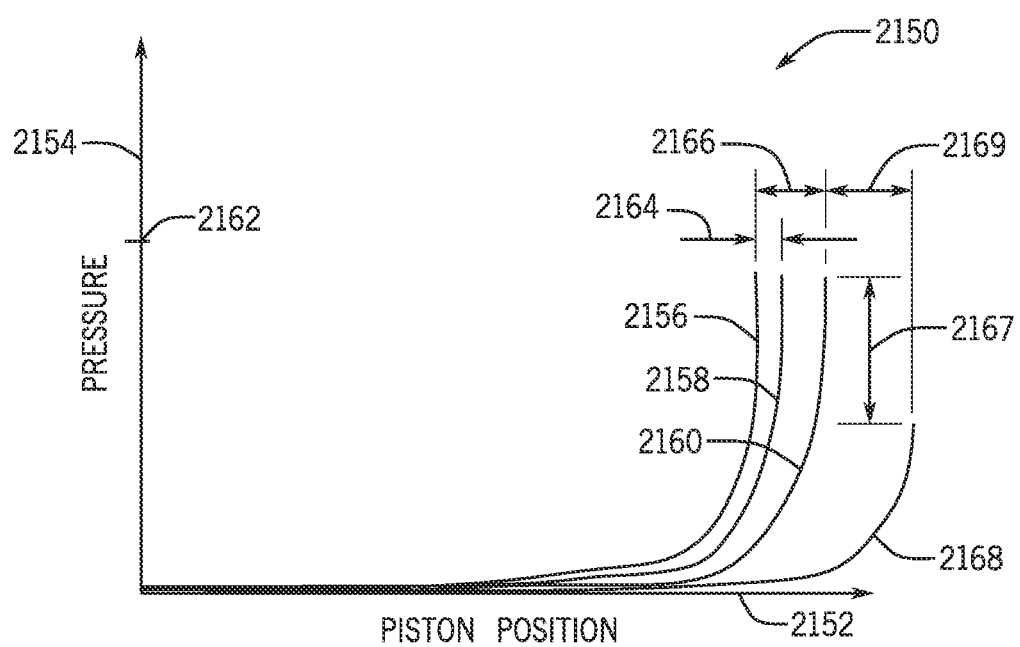
FIG. 24 is a plot illustrating contact pressure with respect to piston stroke distance, according to some embodiments.

FIG. 24 is a plot 2150 illustrating a response of the donut 1802 with respect to a position of the piston 1805 (e.g., piston stroke length). The plot includes a first axis 2152 (e.g., x-axis) that represents the position of the piston 1805 (e.g., piston stroke length) and a second axis 2154 (e.g., y-axis) that represents pressure or strain. The response of the donut 1802 is illustrated with curves 2156, 2158, and 2160. The curves 2156, 2158, and 2160 represent actuation of the donut 1802 at different times, with the curve 2156 being at a first time, followed sequentially by the curve 2158 at a second time and then by the curve 2160 at a third time. In some embodiments, the curve 2156 may be considered a baseline or initial curve that establishes an expected behavior to seal about a tool with a particular diameter size without collapse of the donut 1802 and/or the packer 1804.

As illustrated, with each closure, the piston 1805 moves a greater distance to reach the desired pressure or strain level 2162 on the donut 1802. For example, the piston 1805 may have to move an additional distance 2164 at the second closure compared to the first closure, and an additional distance 2166 at the third closure compared to the first closure. The changes in the position of the piston 1805 to reach the desired pressure or strain level 2162 may indicate volume loss of the donut 1802 and/or the packer 1804, as discussed above with respect to FIG. 22.

In response to the piston position and/or the volume loss exceeding an additional threshold (e.g., the piston position and/or the volume loss varies by more than 10 percent compared to a most recent closure or a baseline closure), the controller 1814 may identify the collapse of the donut 1802 and output the recommendation to replace the donut 1802 and/or the packer 1804. In some embodiments, the controller 1814 may identify the collapse of the donut 1802 in response to at least one significant difference between a previous response curve and a current response curve, such as at least one of a difference 2167 in a maximum contact pressure sensed by the sensor 1812 and a difference 2169 in the maximum distance of the piston stroke length. As illustrated, the difference 2167 illustrates a significant drop (e.g., greater than a pressure threshold, such as 5 percent or 10 percent) between the maximum pressure of the curve 2160 and the maximum pressure of the curve 2168. This significant drop is indicative of a loss of contact between the sensor 1812 and the donut 1802 due to significant material loss (e.g., volume loss). The loss of contact inhibits the ability of the sensor 1812 to accurately detect pressure or strain on the donut 1802 and/or the ability of the donut 1802 to transfer pressure to the sensor 1812.

In the illustrated embodiment, the decrease in the maximum pressure is accompanied by a significant increase (e.g., greater than the additional threshold) in the piston stroke length. As illustrated, the difference in the piston stroke length between the curve 2158 and the curve 2160 is significantly less than the difference 2169 in the piston stroke length between the curve 2160 and the curve 2168. The significant increase in the piston stroke length 2169 is similarly indicative of significant material loss in that the piston 1805 has to move a significant distance to drive the donut 1802 to achieve even the lower pressure. In some embodiments, the controller 1814 may identify the collapse of the donut 1802 when the difference 2167 exceeds the pressure threshold and/or when the difference 2169 exceeds the additional threshold. It should be appreciated that any of the techniques disclosed with reference to FIGS. 22 and 23 may be applied in the context of the collapse of the donut 1802 (e.g., the calibration step, the operations).

Figure 25:
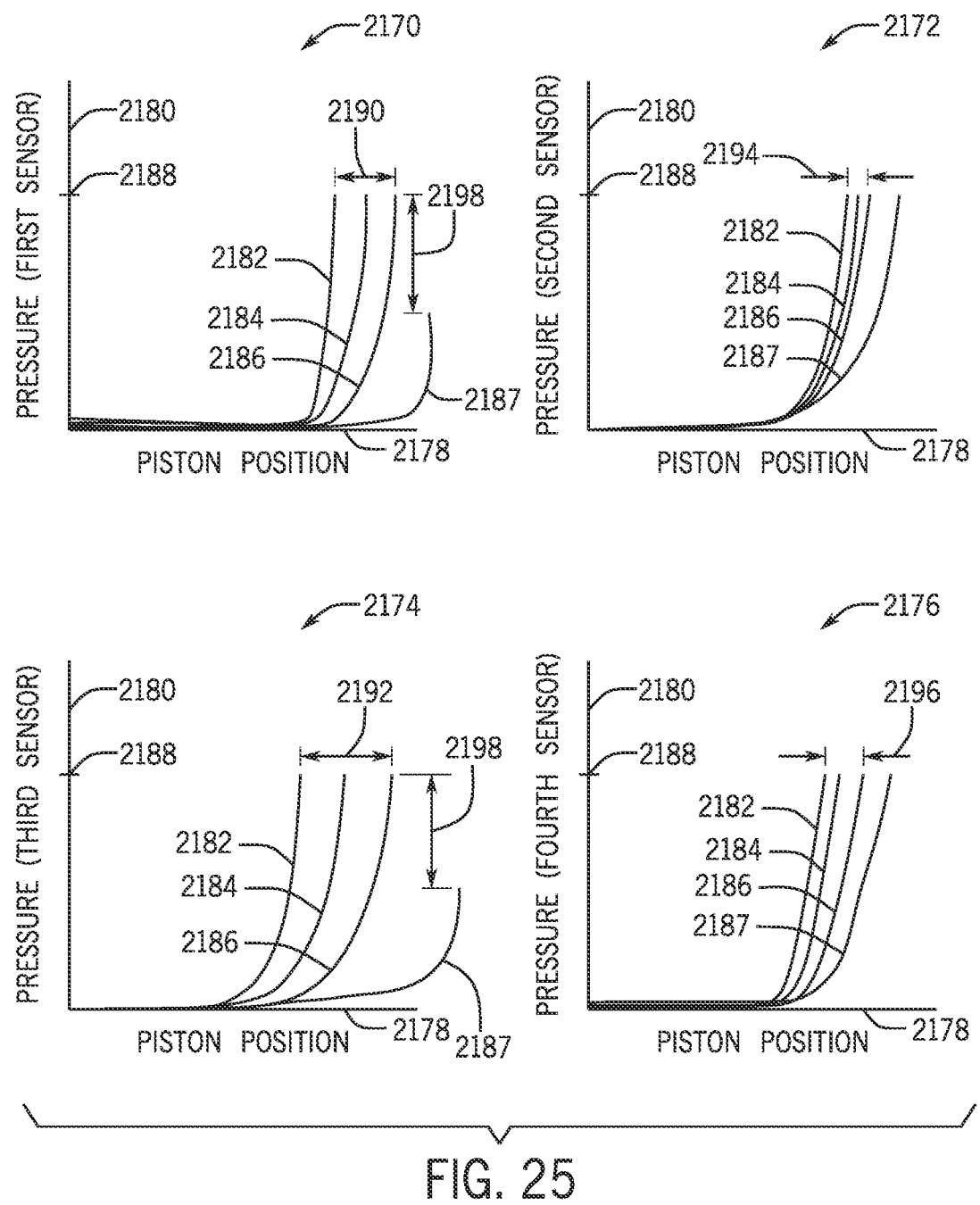
FIG. 25 is multiple plots illustrating contact pressure with respect to piston stroke distance, according to some embodiments.

FIG. 25 illustrates plots 2170, 2172, 2174, and 2176 that illustrate a response of the donut 1802 at different locations about the annular BOP 1798. As explained above, the detection system 1800 may include multiple sensors 1812 that detect the pressure or strain of the donut 1802 at different locations 1840, and thus, whether different portions of the donut 1802 have experienced collapse. FIG. 25 illustrates an example of feedback that may be provided from four different sensors 1812 during collapse of the donut 1802. Accordingly, the plot 2170 represents the response of the donut 1802 at a first location as detected by a first sensor 1812, the plot 2172 represents the response of the donut 1802 at a second location as detected by a second sensor 1812, the plot 2174 represents the response of the donut 1802 at a third location as detected by a third sensor 1812, and the plot 2176 represents the response of the donut 1802 at a fourth location as detected by a fourth sensor 1812. Each plot includes an x-axis 2178 that represents the piston position (e.g., piston stroke length) and a y-axis 2180 that represents pressure or strain. Furthermore, each plot includes curves 2182, 2184, 2186, and 2187 that represent actuation of the donut 1802 at different times, with the curve 2182 being at a first time, followed sequentially by the curve 2184 at a second time, the curve 2186 at a third time, and the curves 2187 at a fourth time.

To facilitate understanding, the change in the piston position that would be needed to achieve the desired pressure or strain level 2188 at each location about the circumference is shown in each plot; however, it should be appreciated that in operation, the piston position would remain generally the same at each location about the circumference (e.g., the piston 1805 is annular and moves as one piece within the BOP housing 1807), and instead, the pressure may vary at the locations about the circumference for the piston positions at the different times due to the volume loss of the donut 1802 and/or the packer 1804.

As explained above, each time the annular BOP 1798 closes, the piston 1805 may move a greater distance to reach the desired pressure or strain level 2188 on the donut 1802 due to the volume loss of the donut 1802 and/or packer 1804. However, the donut 1802 and/or the packer 1804 may not experience uniform volume loss about the circumference. For example, different sections about the circumference may experience different levels of volume loss. Furthermore, different sections about the circumference may behave differently under collapse of the donut 1802, as only one side of the donut 1802 may buckle during the collapse.

The differences at the different sections about the circumference is illustrated in the plots 2170, 2172, 2174, and 2176. As illustrated, the distances 2190 and 2192 between the curves 2182, 2184, and 2186 in the plots 2170 and 2174 are greater than the distances 2194 and 2196 between the curves 2182, 2184, and 2186 in the plots 2172 and 2176. These differences in distances indicate more volume loss and/or different behavior of the donut 1802 and/or the packer 1804 on one side of the annular BOP 1798 (e.g., at the first sensor and the third sensor) as compared to an opposite side of the annular BOP 1798 (e.g., at the second sensor and the fourth sensor). For example, one half of the donut 1802 and/or the packer 1804 may experience more volume loss and/or buckling, while the other half of the donut 1802 and/or the packer 1804 may experience less volume loss and/or no buckling. Such uneven measurements, particularly with significant changes only on one side (e.g., one half) and either minimal or no changes on the other side (e.g., the other half), may indicate the collapse of the donut 1802. It should be appreciated that, instead or in addition, the collapse of the donut 1802 may be indicated by the difference 2198 in the pressure at the locations about the circumference for the piston positions at the different times. For example, the collapse of the donut 1802 may be indicated by the pressure at the first location and the third location being less (e.g., significantly less) than the pressure at the second location and the fourth location for a given position of the piston 1805. It should also be appreciated that the donut 1802 and/or the packer 1804 may shift within the annular BOP 1798 upon the collapse of the donut 1802, such that the piston stroke length decreases and/or the pressure increases on one side, while the piston stroke length increases and/or the pressure decreases on the other side with the collapse of the donut 1802.

As explained herein, the resolution of the detection system 1800 may increase by including additional sensors 1812. In other words, additional sensors 1812 may enable the detection system 1800 to detect which portions of the donut 1802 and/or the packer 1804 have collapsed. This may enable the controller 1814 to detect the collapse even if only a portion of the donut 1802 and/or the packer 1804 have collapsed. This may enable the controller 1814 to provide an output indicative of the collapse and/or the locations of the collapse (e.g., an image that represents the collapse) and/or to provide a recommendation to conduct maintenance operations on the annular BOP 1798, among other actions disclosed herein. The controller 1814 may also control other operations, such as to stop stripping operations, to close a ram BOP, or the like, based on the collapse.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is intended to cover all modifications, equivalents, and alternatives falling within the spirit and scope of the disclosure as defined by the following appended claims. Indeed, any features shown in or described with reference to FIGS. 1-25 may be combined in any suitable manner. Furthermore, it should be appreciated that the detection system may be utilized with any of a variety of types of equipment, including with any of a variety of types of annular BOPs.

What is claimed is:

1. A detection system, comprising:
    an annular blowout preventer (BOP) having an annular elastomer component;
    a pressure sensor configured to contact the annular elastomer component of the annular BOP, wherein the pressure sensor is configured to generate a first signal indicative of a contact pressure with the annular elastomer component, and the pressure sensor is oriented at an acute angle relative to a radial axis of the annular BOP;
    a piston stroke sensor configured to generate a second signal indicative of a piston stroke distance; and
    a controller having a memory, a processor, and instructions stored on the memory and executable by the processor to:
        receive the first signal from the pressure sensor and the second signal from the piston stroke sensor; and
        analyze respective changes in the contact pressure and respective changes in the piston stroke distance to determine a condition of the annular BOP.

2. The detection system of claim 1, wherein the condition of the annular BOP comprises a diameter of a tool in the annular BOP.

3. The detection system of claim 2, wherein the controller further has instructions stored on the memory and executable by the processor to access and use a look up table to determine the diameter of the tool in the annular BOP.

4. The detection system of claim 2, wherein the controller further has instructions stored on the memory and executable by the processor to determine that the diameter of the tool has a first diameter value in response to the piston stroke distance having a first stroke value that provides the contact pressure having a first pressure value, and to determine that the diameter of the tool has a second diameter value in response to the piston stroke distance having a second stroke value that provides the contact pressure having the first pressure value.

5. The detection system of claim 1, wherein the controller has the instructions stored on the memory and executable by the processor to analyze the respective changes in the contact pressure over time during a stripping operation to detect a tool joint within the annular BOP.

6. The detection system of claim 5, wherein the controller further has instructions stored on the memory and executable by the processor to;

detect the tool joint within the annular BOP by identifying a signature in the respective changes in the contact pressure over time during the stripping operation; and
determine a time period in which a shearable portion of a tool having the tool joint is aligned with a shear ram BOP based on detection of the tool joint within the annular BOP.

7. The detection system of claim 1, wherein the controller has the instructions stored on the memory and executable by the processor to analyze respective changes in the contact pressure relative to the piston stroke distance over a plurality of strokes to determine the condition.

8. The detection system of claim 1, wherein the condition of the annular BOP comprises a volume loss of the annular elastomer component of the annular BOP.

9. The detection system of claim 8, wherein the controller further has instructions stored on the memory and executable by the processor to:
    determine that the volume loss of the annular elastomer component is significant in response to the piston stroke distance exceeding a threshold to provide the contact pressure having a first pressure value; and
    provide a recommendation to carry out a maintenance operation in response to determining that the volume loss of the annular elastomer component is significant.

10. The detection system of claim 1, wherein the condition of the annular BOP comprises a collapse of the annular elastomer component of the annular BOP.

11. The detection system of claim 1, wherein an interface between the pressure sensor and the annular elastomer component is oriented at the acute angle relative to the radial axis of the annular BOP, the interface extends along a tapered surface of the annular elastomer component, and the acute angle is between 15 to 85 degrees.

12. The detection system of claim 1, comprising a plurality of additional pressure sensors, wherein the pressure sensor and the plurality of additional pressure sensors are distributed circumferentially at a plurality of circumferential positions about the annular elastomer component, wherein the controller further has instructions stored on the memory and executable by the processor to analyze circumferential variations in the contact pressure relative to the piston stroke distance to determine the condition of the annular BOP, wherein the condition comprises circumferential variations in a volume loss or collapse at the plurality of circumferential positions.

13. A detection system, comprising:
    an annular blowout preventer (BOP) having an annular elastomer component;
    a first pressure sensor configured to contact the annular elastomer component of the annular BOP, wherein the first pressure sensor is configured to generate a first signal indicative of a first contact pressure with the annular elastomer component;
    a second pressure sensor configured to contact the annular elastomer component of the annular BOP, wherein the second pressure sensor is configured to generate a second signal indicative of a second contact pressure with the annular elastomer component, wherein at least one of the first pressure sensor or the second pressure sensor is oriented at an acute angle relative to a radial axis of the annular BOP;
    a piston stroke sensor configured to generate a third signal indicative of a piston stroke distance; and
    a controller having a memory, a processor, and instructions stored on the memory and executable by the processor to:

receive the first signal from the first pressure sensor, the second signal from the second pressure sensor, and the third signal from the piston stroke sensor; and analyze respective changes in the first contact pressure, respective changes in the second contact pressure, and respective changes in the piston stroke distance to determine a condition of the annular BOP.

14. The detection system of claim 13, wherein the condition of the annular BOP comprises a diameter of a tool in the annular BOP.

15. The detection system of claim 13, wherein the controller further has instructions stored on the memory and executable by the processor to analyze the respective changes in the first contact pressure, the respective changes in the second contact pressure, or both during a stripping operation to detect a tool joint within the annular BOP.

16. The detection system of claim 13, wherein the condition of the annular BOP comprises a volume loss of the annular elastomer component of the annular BOP.

17. The detection system of claim 13, wherein the condition of the annular BOP comprises a collapse of the annular elastomer component of the annular BOP.

18. The detection system of claim 13, wherein the first pressure sensor and the second pressure sensor are offset at different circumferential positions about a circumference of the annular elastomer component, wherein the controller further has instructions stored on the memory and executable by the processor to analyze variations in the first and second contact pressures relative to the piston stroke distance to determine the condition of the annular BOP.

19. The detection system of claim 13, wherein the controller further has instructions stored on the memory and executable by the processor to analyze respective changes in the first and second contact pressures relative to the piston stroke distance over a plurality of strokes to determine the condition of the annular BOP.

20. A detection system, comprising:

an annular blowout preventer (BOP) having an annular elastomer component;

a pressure sensor configured to contact the annular elastomer component of the annular BOP, wherein the pressure sensor is configured to generate a first signal indicative of a contact pressure with the annular elastomer component, and the pressure sensor is oriented at an acute angle relative to a radial axis of the annular BOP;

a piston stroke sensor configured to generate a second signal indicative of a piston stroke distance; and a controller having a memory, a processor, and instructions stored on the memory and executable by the processor to:

receive the first signal from the pressure sensor and the second signal from the piston stroke sensor; and analyze respective changes in the contact pressure and respective changes in the piston stroke distance to determine a diameter of a tool in the annular BOP, a presence of a tool joint within the annular BOP, a volume loss of the annular elastomer component, and a collapse of the annular elastomer component.

* * * * *